(12) United States Patent  (10) Patent No.: US 7,645,035 B2
Adachi et al.  (45) Date of Patent: Jan. 12, 2010

(54) INK SET, INK-JET PRINTING METHOD, AND INK-JET PRINTER

(75) Inventors: Hiroshi Adachi, Kanagawa (JP); Juichi Furukawa, Kanagawa (JP)

(73) Assignee: Ricob Company, Ltd., Tokyo (JP)

( * ) Notice: Subject to any disclaimer, the term of this patent is extended or adjusted under 35 U.S.C. 154(b) by 0 days.

(21) Appl. No.: 10/888,367

(22) Filed: Jul. 8, 2004

(65) Prior Publication Data

US 2005/0012798 A1  Jan. 20, 2005

Related U.S. Application Data

(63) Continuation of application No. PCT/JP03/00030, filed on Jan. 7, 2003.

(30) Foreign Application Priority Data

Jan. 8, 2002 (JP) ............... 2002-001849
Jan. 28, 2002 (JP) ............... 2002-017842

(51) Int. Cl.
*G01D 11/00* (2006.01)
(52) U.S. Cl. .............. 347/100; 347/95; 347/96
(58) Field of Classification Search ................. 347/100, 347/101, 96, 98, 95, 102, 10; 523/160; 106/31.6, 106/31.13, 31.27

See application file for complete search history.

(56) References Cited

U.S. PATENT DOCUMENTS 5,640,187 A  6/1997  Kashiwazaki et al.
5,679,724 A  10/1997 Sacripante et al.
6,428,862 B1* 8/2002  Noguchi ............ 427/511
6,460,989 B1  10/2002 Yano et al.
6,506,239 B1* 1/2003  Osumi et al. .......... 106/31.27
6,517,199 B1* 2/2003  Tomioka et al. ........ 347/100
6,652,084 B1* 11/2003 Teraoka et al. .......... 347/100

(Continued)

FOREIGN PATENT DOCUMENTS

EP  587164  3/1994

(Continued)

OTHER PUBLICATIONS

Aug. 26, 2005 Chinese Office Action in connection with Chinese Patent Application No. 038020122.

(Continued)

*Primary Examiner*—Manish S Shah
(74) *Attorney, Agent, or Firm*—Cooper & Dunham LLP

(57) ABSTRACT

The present invention provides an ink set which includes a combination of a recording liquid including a resin-coated colorant, and a treatment liquid including a particle which has a reactivity with the resin-coated colorant. The ink set can obtain a high quality image free from feathering and color bleeding, can obtain a high quality image even when used for printing on a plain paper sheet, can obtain a print excellent in wear resistance, can obtain a high image density without causing a deep permeation of a recording liquid in the paper sheet, can perform a favorable double-sided printing with a low image density when the image is viewed from an opposite face of an image print face, can be free from an image stain attributable to drying failure of the recording liquid, and can provide the print with a proper glossiness.

19 Claims, 4 Drawing Sheets

U.S. PATENT DOCUMENTS

| | | | |
|---|---|---|---|
| 6,986,572 B2 * | 1/2006 | Lauw et al. | 347/100 |
| 2002/0077384 A1 * | 6/2002 | Sano et al. | 523/160 |
| 2003/0064206 A1 * | 4/2003 | Koyano et al. | 428/195 |
| 2003/0069329 A1 * | 4/2003 | Kubota et al. | 523/160 |
| 2005/0012796 A1 * | 1/2005 | Doi et al. | 347/100 |

FOREIGN PATENT DOCUMENTS

| | | | |
|---|---|---|---|
| EP | 0 765 920 A2 | | 4/1997 |
| EP | 0 801 118 A2 | | 10/1997 |
| EP | 0 812 888 A2 | | 12/1997 |
| EP | 0 953 616 A2 | | 11/1999 |
| EP | 1077238 | | 2/2001 |
| EP | 1077238 A1 | * | 2/2001 |
| EP | 1099732 A1 | | 5/2001 |
| EP | 1243435 A1 | | 9/2002 |
| JP | 06-092010 | | 4/1994 |
| JP | 2667401 | | 6/1997 |
| JP | 10-140065 | * | 5/1998 |
| JP | 2000-318300 | | 11/2000 |
| JP | 2001-123098 | | 5/2001 |
| JP | 2001-199149 | | 7/2001 |
| WO | WO 98/47972 | | 10/1998 |
| WO | WO00/06390 | | 2/2000 |

OTHER PUBLICATIONS

Oct. 17, 2006 EPO Communication and European Search Report.
Intellectual Property Office of Singapore, Search Report and Written Opinion dated Apr. 17, 2007 in Singapore Patent Appln. No. 200603897-0.

* cited by examiner

INK SET, INK-JET PRINTING METHOD, AND INK-JET PRINTER

CROSS-REFERENCE TO RELATED APPLICATIONS

This is a continuation of International Application PCT/JP03/00030, filed Jan. 7, 2003, and designating the United States, pursuant to 35 U.S.C. § 365(c).

BACKGROUND OF THE INVENTION

1. Field of the Invention

The present invention relates to an ink set characterized in that a treatment liquid including particle is combined with a recording liquid including resin-coated colorant, a specific treatment liquid for the ink set, a specific recording liquid for the ink set, an ink-jet printing method for forming an image by adhering the treatment liquid and the recording liquid to a recording medium, an ink-jet printer, a cartridge for receiving therein the treatment liquid and the recording liquid, and an ink-jet record article produced by using the ink-jet printer.

2. Description of the Related Art

An ink-jet printing method for carrying out an image recording by using, as a liquid droplet, a recording liquid including a colorant is excellent in that the above printing method has a simple printing mechanism and is free from noise.

On the other hand, the above image printing method is likely to cause an image failure whose typical example is a character feathering (hereinafter referred to as feathering) attributable to some combinations with a recording medium, thus greatly deteriorating image quality. Trying to decrease the feathering by suppressing ink permeability is carried out. In this case, however, deteriorated dryness of the ink may cause failures such as: touching a print after printing may allow the ink to adhere to a hand, the image may be stained, and the like.

Moreover, printing a color image overlaps different colors of ink one after another, thus causing bleeding of color ink at a color boundary portion or causing a non-uniform mixture (hereinafter referred to as "color bleeding"), thus substantially decreasing the image quality, which is problematical. Increasing the ink permeability is being tried for solving the problem, namely, for decreasing the color bleeding. In this case, however, the colorant entering the recording medium may decrease image density and increase permeation of the ink to a back of a recording medium, thereby making it difficult to carry out a favorable double-sided printing.

Therefore, the image forming method is desired to solve the above problems at the same time and increase the image quality.

To the above problems, a method of combining a recording liquid with a treatment liquid (which includes particle) is proposed. For example, an ink-jet printing method is disclosed (for example, refer to Japanese Patent Application Laid-Open (JP-A) No. 04-259590 (Scope of claim for patent on line 1 to line 7 in column 1 on page 2, paragraph[0010], paragraph [0015] and paragraph [0022])) in which a colorless liquid including silica particle is adhered to a recording medium, followed by adhering of a non-aqueous recording liquid including oil black. Moreover, an ink-jet printing method is disclosed (for example, refer to Japanese Patent Application Laid-Open (JP-A) No. 06-92010 (claim 1 on line 2 to line 8 in column 1 on page 2 and paragraph [0010])) in which resin particle, titanium dioxide particle or the like, or a solution including the above particles and binder polymer is applied or injected before a recording liquid including pigment and resin is discharged. Moreover, an image forming method is disclosed (for example, refer to Japanese Patent Application Laid-Open (JP-A) No. 11-228890 (Scope of claim for patent on line 1 to line 27 in column 1 on page 2)) in which an image is formed on a recording medium by discharging a colorless ink-jet treatment liquid (including anionic metal oxide colloid) separately from discharging of an ink (including colorant but not resin content), followed by mixing.

Each of Japanese Patent Application Laid-Open (JP-A) No. 04-259590 and Japanese Patent Application Laid-Open (JP-A) No. 11-228890, however, discloses a combination of the recording liquid (including anionic colorant) with the treatment liquid (including anionic particle), thus making aggregation effect and absorption effect of the colorant unobtainable, resulting in failure in suppression of feathering and color bleeding. Japanese Patent Application Laid-Open (JP-A) No. 06-92010 disclosing a combination of anionic colorant with cationic titanium dioxide can feature a certain effect in terms of aggregation and absorption of the colorant, however, does not show a sufficient effect for suppressing feathering and color bleeding. Use of low viscosity ink and low viscosity treatment liquid in Patent Japanese Patent Application Laid-Open (JP-A) No. 06-92010 may flow out aggregation component, thus causing failure in sufficient suppression of feathering and color bleeding, which is problematical.

Moreover, an image forming method is disclosed (for example, refer to Japanese Patent Application Laid-Open (JP-A) No. 2001-199149 (claim 2on line 13 to line 21 in column 1 on page 2)) having a step of absorbing to a particle surface a colorant that is in a single-molecule state in a liquid droplet and a step of causing aggregation of particles having the surface to which the colorant is absorbed. Moreover, an ink set is disclosed (for example, refer to Japanese Patent Application Laid-Open (JP-A) No. 2001-199150 (claim 1 on line 2 to line 9 in column 1 on page 2)) in which pH of a mixture that is an ink and liquid composition mixed substantially at a ratio of 1 to 1 by weight causes colorant aggregation. Moreover, a liquid composition is disclosed (for example, refer to Japanese Patent Application Laid-Open (JP-A) No. 2001-199151 (claim 1 on line 2 to line 7 in column 1 on page 2)) which is included in such a state that a particle having a surface charged with an opposite polarity to that of aqueous ink is dispersed. Although showing a certain effect in terms of color aggregation and color absorption, each of the above documents is, however, unable to bring about a sufficient effect for suppressing feathering and color bleeding.

Moreover, using the treatment liquid including particle, the above proposals have another problem in fusibility of the recording liquid. Specifically, the treatment liquid and the recording liquid are adhered to the recording medium and then a vehicle permeates to the recording medium, thus accumulating a mixture of the particle with the colorant on a surface of the recording medium. The thus formed accumulation is mechanically vulnerable, thereby it may be easily removed by rubbing by hand and the like. This may stain a user's hand by ink or backface of overlapped prints, resulting in failure of wear resistance.

In terms of shortage of wear resistance, an ink-jet printing method is disclosed (for example, refer to International Publication No. WO00/06390 (claim 1 on line 2 to line 6 on page 2)) in which i) a first liquid including a reaction agent which causes aggregation when contacting a polymer particle and/or an ink composition, and ii) the ink composition including the polymer particle are caused to adhere to a recording medium, to thereby carry out printing. In a constitution in International Publication No. WO00/06390, a colorant in itself is free from a function for improving wear resistance, thereby a large amount of polymer particles is needed for obtaining a sufficient wear resistance. Putting a large amount of polymer particles may, however, cause such side effects as decreased discharge stability, decreased preservability stability, increased viscosity and the like, resulting in an unsolved problem.

Moreover, an ink-jet print printing method is disclosed (for example, refer to Japanese Patent Application Laid-Open (JP-A) No. 2001-171095 (claim 1 on line 2 to line 7 in column 1 on page 2)) in which a semi-transparent white ink which is composed of i) an inorganic oxide pigment, ii) dispersant and/or high molecular compound, iii) an water-soluble organic solvent and iv) water is caused to fixed in advance to a recording medium, and an water-soluble dye ink is used for recording an image. In a constitution under Japanese Patent Application Laid-Open (JP-A) No. 2001-171095, however, a colorant in itself is free from a function for improving wear resistance, therefore a large amount of polymer particles are needed for obtaining a sufficient wear resistance, resulting in an unsolved problem.

Moreover, an ink-jet printing method is disclosed (for example, refer to Japanese Patent (JP-B) No. 2667401 (claim 1 on line 2 to line 7 in column 1 on page 1)) in which, so as to form an image, a colorless or hypochromic liquid including two or more cationic groups per molecule is caused to adhere to a recording medium, then the liquid is permeated in the recording medium, then the liquid is present in the recording medium, then the liquid disappears from a surface of the recording medium, and soon after the above steps, an ink including anionic dye is caused to adhere to a portion to which the liquid is caused to adhere. Moreover, an ink-jet printing method is disclosed (for example, refer to Japanese Patent (JP-B) No. 2675001 (claim 1 on line 2 to line 7 in column 1 on page 1)) in which, so as to form an image, a colorless or hypochromic liquid including a multivalent metal salt is caused to adhere to a recording medium, then the liquid is permeated in the recording medium, then the liquid is present in the recording medium, then the liquid disappears from a surface of the recording medium, and soon after the above steps, an ink including oxide-group including dye is caused to adhere to a portion to which the liquid is caused to adhere. Moreover, an ink-jet printing method is disclosed (for example, refer to Japanese Patent (JP-B) No. 2711098 (claim 1 on line 2 to line 9 in column 1 on page 1.)) in which, so as to form an image, a colorless or hypochromic liquid including a quaternary ammonium salt or an amine salt whose molecule has therein one or more groups selected from i) an alkyl group with carbon atoms 4 or more, ii) an alkenyl group and iii) an aryl group is caused to adhere to a recording medium, then the thus adhered liquid is permeated in the recording medium, then the liquid disappears from a surface of the recording medium, and soon after the above steps, an ink including soluble dye including acidic group is caused to adhere to a portion to which the liquid is caused to adhere.

However, using the treatment liquid that does not include particle, the methods disclosed in the above documents are insufficient for improving image density, decreasing character feathering and decreasing color mixture. Moreover, use of the dye whose colorant is not of resin-coated type is insufficient in terms of wear resistance on image forming portion.

SUMMARY OF THE INVENTION

It is therefore an object of the present invention to provide an ink set, a printing method, a printer and a record article which three using the ink set; wherein the ink set can obtain a high quality image free from feathering and color bleeding, can obtain a high quality image even when used for printing on a plain paper sheet, can obtain a print excellent in wear resistance, can obtain a high image density without causing a deep permeation of a recording liquid in the paper sheet, can perform a favorable double-sided printing with a low image density when the image is viewed from an opposite face of an image print face, can be free from an image stain attributable to drying failure of the recording liquid, and can provide the print with a proper glossiness. It is another object of the present invention to provide an ink set, a printing method, a printer and a record article which three using the ink set; wherein the ink can improve waterproof of an image which is obtained on a recording medium, and is excellent in aging (elapsing) stability without causing prosperity of mold and the like to treatment liquid or recording liquid after a long time storage.

DESCRIPTION OF THE PREFERRED EMBODIMENTS

Figure 1:
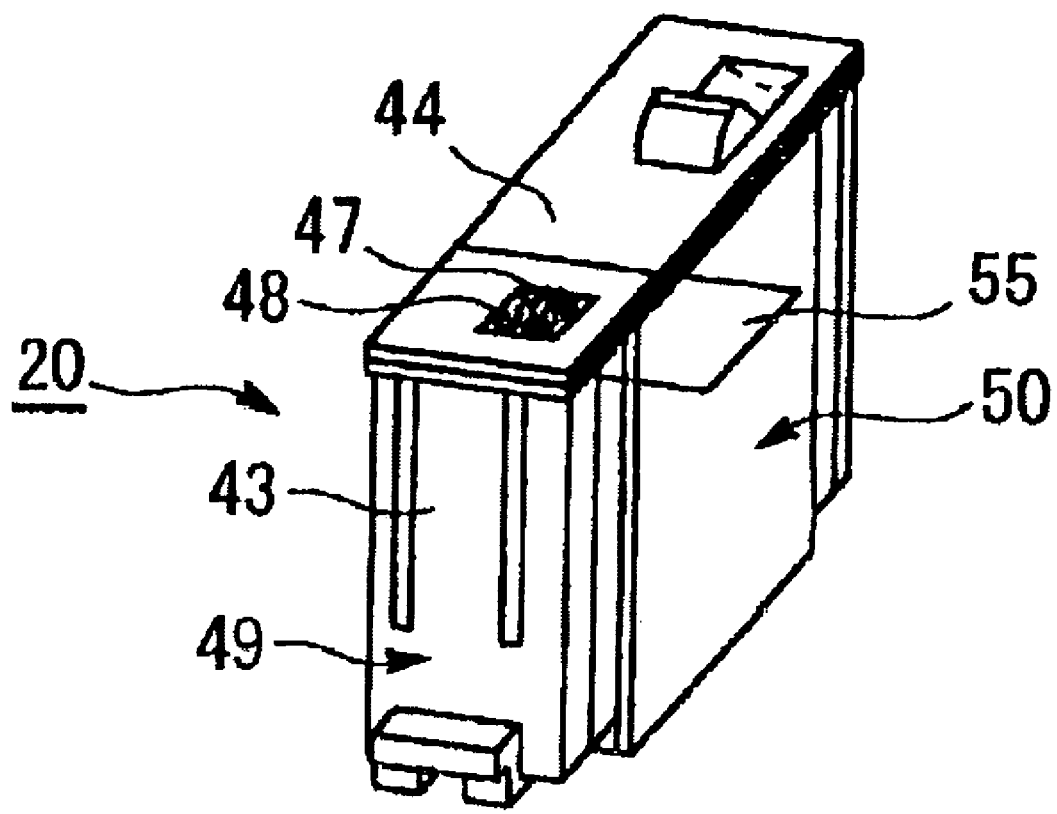
FIG. 1 is an external perspective view of a cartridge which is capable of receiving therein a recording liquid and a treatment liquid under the present invention.

After studying hard so as to achieve the above objects, the present inventor has found out the following. When forming an image by adhering a treatment liquid and a recording liquid to a recording medium, an aggregation state of a liquid droplet caused by a contact of the above liquids is of importance. For controlling it, an ink set having a combination of the treatment liquid including particle with the recording liquid including resin-coated colorant can achieve the above object effectively. By considering viscosities of the above liquids, the present inventor has found that the above problems can be preferably solved, to thereby come up with the present invention.

Solution of the above problems can be achieved by the following (1) to (2):

(1) An ink set comprising:
   a recording liquid including a resin-coated colorant; and
   a treatment liquid including a particle which has a reactivity with the resin-coated colorant.

(2) An ink set according to (1), wherein an aggregation is formed when the treatment liquid and the recording liquid contact each other.

Moreover, solution of the above problems can be achieved by the following (3) to (15):

(3) A treatment liquid used for the ink set according to (1), wherein the particle included in the treatment liquid is made of a cationic material.

(4) A treatment liquid according to (3), wherein the cationic material is a cationic inorganic material.

(5) A treatment liquid according to (4), wherein the cationic inorganic material is a cationic silica.

(6) A treatment liquid according to (3), wherein the treatment liquid includes a water and a water-soluble solvent.

(7) A treatment liquid according to (6), wherein the water-soluble solvent is at least one of a humectant and a penetrant.
(8) A treatment liquid according to (3), wherein the treatment liquid includes an antiseptic for preventing at least one of a corrosion and a mold.
(9) A treatment liquid according to (3), wherein the treatment liquid includes a cationic surfactant.
(10) A treatment liquid according to (3), wherein the treatment liquid includes a rust preventive.
(11) A recording liquid used for the ink set according to (1), wherein the colorant included in the recording liquid is anionic.
(12) A recording liquid according to (11), wherein the anionic colorant is a pigment colorant.
(13) A recording liquid used for the ink set according to (1), wherein the recording liquid further comprises a water and a water-soluble solvent.
(14) A recording liquid according to (13), wherein the water-soluble solvent is at least one of a humectant and a penetrant.
(15) A recording liquid according to (14), wherein the recording liquid includes an antiseptic for preventing at least one of a corrosion and a mold.
(16) A recording liquid according to (14), wherein the recording liquid includes a rust preventive.

Moreover, solution of the above problems can be achieved by the following (17):
(17) An ink set according to (1), wherein at least one of the recording liquid and the treatment liquid has a viscosity of 5 mPa·sec or more at 25° C.

Moreover, solution of the above problems can be achieved by the following (18):
(18) An ink-jet printing method for forming an image by using the ink set according to (1), or by using a combination of the treatment liquid according to (3) and the recording liquid according to (11),
the ink-jet printing method comprising:
adhering the treatment liquid to a recording medium; and
adhering the recording liquid to the recording medium,
to thereby form the image on the recording medium.

Moreover, solution of the above problems can be achieved by the following (19) to (22):
(19) An ink-jet printer for forming an image by using a combination of the ink set according to (1), or by using a combination of the treatment liquid according to (3) and the recording liquid according to (11),
the ink-jet printer comprising:
a conveying section for conveying a recording medium;
a first adhering section for adhering the treatment liquid to the recording medium; and
a second adhering section for adhering the recording liquid to the recording medium,
to thereby form the image on the recording medium.
(20) A treatment liquid cartridge for receiving therein the treatment liquid which is used for the ink set according to any of (1), or the treatment liquid according to (3).
(21) A recording liquid cartridge for receiving therein the recording liquid which is used for the ink set according to (1), or the recording liquid according to (11).
(22) An ink-jet record article which is produced by using the ink-jet printer according to (19).

Hereinafter described are details about the present invention.

In an ink set used for an ink-jet record under the present invention, preferably, a recording liquid includes an anionic colorant and a treatment liquid includes a cationic particle. Moreover, at least one of the recording liquid and the treatment liquid has a preferable viscosity of 5 mPa·sec or more at 25° C. Herein, the viscosity of the recording liquid and the treatment liquid is to be measured with a rotary viscosimeter or a vibratory viscosimeter.

Under the present invention, a mechanism for improving image quality is considered as below, but not limited thereto.

Adhering the treatment liquid including particle and the recording liquid including resin-coated colorant to a recording medium may accumulate a mixture of the particle and the resin-coated colorant on a surface of the recording medium, allowing a vehicle to permeate in the recording medium. At this time, the resin-coated colorant accumulated on the recording medium, which has in itself a resin component, may bind with peripheral particles, thereby forming a mechanically strong film and featuring a good wear resistance. Moreover, a resin film formed on the surface may increase glossiness. Furthermore, various levels of lights in the resin material film intervened between colorants may be so well mixed and reflected, thus obtaining a bright intermediate color.

When the resin component is not included in the recording liquid or the treatment liquid, the accumulated layer becomes mechanically so week that the accumulated layer may be removed with ease when something has a contact with it. As a result, user's hand may be stained with the ink or the ink may stain a backface of overlapped prints.

When polymer particles are included in the recording liquid or the treatment liquid but the colorant in itself is free from the resin component and thereby is free from wear resistance improving function, a large amount of the polymer particles are to be added so as to embed a periphery of the colorant for the improved wear resistance. The treatment liquid or the recording liquid added by a large amount of polymer particles may decrease discharge stability and preservability stability, and may cause an increased viscosity. Decreasing the amount of the polymer particles added is needed for keeping the discharge stability and the preservability stability and properly suppressing the viscosity. In this case, however, a sufficient wear resistance cannot be obtained, thus not reaching the problem solution.

Moreover, when a soluble resin replaces the particle as a reaction agent in the treatment liquid, the soluble resin may form a non-permeable film on the recording medium, thereby preventing permeation of the vehicle, resulting in decreased dryness and deteriorated color bleeding.

In this case, when both of the recording liquid and the treatment liquid have low viscosity and thereby lowering viscosity of the mixture of the recording liquid and the treatment liquid, the aggregation may flow out laterally before the vehicle included in the recording liquid and the treatment liquid permeates in the recording medium. As a result, a sufficient effect of decreasing the feathering and the color bleeding may occasionally not be obtained.

Making the viscosity of at least one of the recording liquid and the treatment liquid 5 mPa·sec or more at 25° C. may increase the viscosity of the mixture, thereby preventing the aggregation from flowing out laterally. Moreover in this case, the vehicle included in the recording liquid and the treatment liquid may proceed its permeation in the recording medium, thus effectively preventing the feathering and the color bleeding.

Preferably, the cationic particle included in the treatment liquid has its surface charged, and thereby particles may cause repulsion to each other by the above surface charge, thus stabilizing dispersion. The recording liquid including anionic colorant contacting the treatment liquid including cationic particle may allow the anionic colorant to be strongly absorbed to the cationic particle by an electrical operation. In this case, the surface charge of the cationic particle may be neutralized by a charge of the anionic colorant, thus eliminating the repulsion between the cationic particles and thereby the cationic particle and the anionic colorant may form a large aggregation.

Moreover, a soluble group such as a carbonyl group and a sulfonyl group of the anionic colorant may be masked by the cationic particle in the absorbing, thereby rapidly decreasing solubility of the aggregation in water and further increasing the aggregation in size. Formation of the above rapid aggregation may allow the aggregation to be trapped in a porous portion of the recording medium when the recording liquid and the treatment liquid are permeated in the recording medium. With this, the colorant may find it difficult to move, thus decreasing the feathering and the color bleeding.

The ink set in this case, with the cationic particle and the anionic colorant forming a particulate aggregation to be accumulated in a form of a stone wall in the vicinity of the surface of the recording medium, may form a permeable film. With this, the vehicle included in the recording liquid and the treatment liquid may be acceleratedly permeate in the recording medium, thereby the color bleeding may become good and the dryness of the record image may become good.

Compared with the above, according to the conventional technology using the treatment liquid with the polymer dissolved therein, the polymer may form a film on the surface of the recording medium, thus preventing the permeation of the vehicle, resulting in decreased dryness of the record image. Under the prevent invention, however, the above problem can be solved.

Moreover, as described above, the aggregation accumulated in a form of a stone wall in the vicinity of the surface of the recording medium may obtain a record image that has a high image density, moreover, may suppress the ink from permeating to the backside of the recording medium, thus bringing about an excellent double-sided printing property.

Moreover, as described above, the soluble group such as the carbonyl group and the sulfonyl group of the anionic colorant masked by the cationic particle in the absorbing can decrease solubility of the aggregation in water, thus improving waterproof of the record image.

With the resin-coated type pigment under the present invention, it is important for the resin not to be separated from the colorant in the recording liquid, and not to be dissolved although a small amount of resin may be dissolved in water or expanded. It is also important for the resin to have a strong compatibility with the colorant. The resin coating the pigment is in a state that the resin is partly dissolved in the recording liquid or expanded in the recording liquid.

Distinguishing the resin-coated type pigment from a high molecular dispersing type pigment may be done by the following steps: i) increase visibility of resin film by mixing in a recording liquid a substance that is absorbed selectively to the resin, ii) observe the colorant component with an analyzer such as a transmission electron microscope (TEM) and the like, and iii) determine coated state. The resin-coated type is entirely coated with the resin, while the high molecular type has many portions not coated with the resin.

Moreover, the distinguishing of the resin-coated type pigment from the high molecular dispersing type can be made from a weight ratio of the pigment relative to the resin (high molecule). A specific method is: i) deposit pigment and resin by such a step as to vary pH of the recording liquid, and ii) add an organic solvent to the thus deposited component for extracting the resin. With the above operations, the weight ratio of the pigment relative to the resin can be obtained. For the resin to coat the surface of the pigment, the weight ratio (resin/pigment) is preferred to be 0.01 or more.

Moreover, rubbing the pigment with a finger or a cloth after the recording liquid is dried may find the following: the resin-coated type pigment that is securely fixed to a paper sheet by means of the resin is free from color drop, while the high molecular dispersing type that is not securely fixed to the paper sheet due to its shortage of high molecule components causes color drop. The above finding is another point of distinction.

Using the resin-coated colorant under the present invention that has in itself the resin component may bring about a binding effect with a small amount of resin additive and obtain a sufficient wear resistance. The resin additive that is small in amount may avoid failures in such properties as discharge stability, preservability stability and viscosity.

The amount of the resin added is preferably 0.01 weight % or more to less than 20 weight % relative to an entire liquid, more preferably 1 weight % or more to less than 5 weight %. Preferably, it is 0.1 weight % or more to less than 200 weight % relative to the colorant, more preferably 10 weight % or more to less than 50 weight %.

The recording liquid under the present invention includes the colorant that is coated with the resin. The resin may coat the surface of the colorant entirely or partly. Moreover, a periphery of the colorant may be coated in a form of a microcapsule, or the colorant can be mixed with the resin.

The coating resin is preferred to use a polymer that is compatible with the colorant. Examples of the resin include vinyl resin, polyester resin polyurethane resin, and the like. Of the above resins, the vinyl resin is preferable. As the vinyl resin, a polymer of at least one monomer selected from styrene, (meth)acrylate, and (meth)acrylate ester.

Under the present invention, both dye and pigment can be used for the colorant. However, an anionic dye or an anionic pigment is preferable for a cationic particle for better electrical neutralization and aggregation, so as to improve image. Moreover, use of dye is more preferred than pigment. Specifically, when electrically neutralized, the pigment in a dispersion state can cause the aggregation more efficiently than the dye in a soluble state, thus improving the image.

Pigments used for the recording liquid under the present invention include: i) organic pigments such as azo group, phthalocyanine group, anthraquinone group, quinacridone group, dioxazine group, indigo group, thioindigo group, perylene group, isoindolenone group, aniline black, azomethine group, rhodamine B lake pigment, carbon black, and the like, and ii) inorganic pigments such as iron oxide, titanium oxide, calcium carbonate, barium sulfate, aluminum hydroxide, barium yellow, iron blue, cadmium red, chrome yellow, and metal power.

Examples of pigment dispersing agent including anionic group include: polyacrylic acid, polymethacrylic acid, styrene acrylic resin, styrene maleic acid, soluble vinyl naphthalene acrylic resin, soluble vinyl naphthalene maleic acid resin, formalin β-naphthalene sulfonate condensation, carboxymethyl cellulose, starch glycolic acid, sodium alginate, pectic acid, hyaluronic acid, and the like. The above anionic group dispersing agents can be used in a form of acid, but alkali metal salts such as sodium and potassium are also usable.

A typical example of the pigment having anionic group on its surface is carbon black that has carboxyl group or sulfonic group. Other examples include those obtained by the following: phthalocyanine group pigment or anthraquinone group pigment that is oxidized or treated by fuming sulfuric acid to thereby introducing carboxyl group or sulfonic group in a part of pigment particle.

Used for the soluble dye under the present invention include: those categorized into acid dye, direct dye, basic dye, reactive dye, and edible dye in color index and excellent in waterproof and light resistance. Mixing the above dyes is allowed for use or, when necessary, the above dye(s) can be mixed with other pigment such as pigment. The above colorants can be added within a scope that the effect of the present invention is not hindered.

| (a) As acid dye and edible dye: | |
|---|---|
| C.I. acid yellow | 17, 23, 42, 44, 79, 142 |
| C.I. acid red | 1, 8, 13, 14, 18, 26, 27, 35, 37, 42, 52, 82, 87, 89, 92, 97, 106, 111, 114, 115, 134, 186, 249, 254, 289 |
| C.I. acid blue | 9, 29, 45, 92, 249 |
| C.I. acid black | 1, 2, 7, 24, 26, 94 |
| C.I. food yellow | 3, 4 |
| C.I. food red | 7, 9, 14 |
| C.I. food black | 1, 2 |
| (b) As direct dye: | |
| C.I. direct yellow | 1, 12, 24, 26, 33, 44, 50, 86, 120, 132, 142, 144 |
| C.I. direct red | 1, 4, 9, 13, 17, 20, 28, 31, 39, 80, 81, 83, 89, 225, 227 |
| C.I. direct orange | 26, 29, 62, 102 |
| C.I. direct blue | 1, 2, 6, 15, 22, 25, 71, 76, 79, 86, 87, 90, 98, 163, 165, 199, 202 |
| C.I. direct black | 19, 22, 32, 38, 51, 56, 71, 74, 75, 77, 154, 168, 171 |
| (c) As basic dye: | |
| C.I. basic yellow | 1, 2, 11, 13, 14, 15, 19, 21, 23, 24, 25, 28, 29, 32, 36, 40, 41, 45, 49, 51, 53, 63, 64, 65, 67, 70, 73, 77, 87, 91 |
| C.I. basic red | 2, 12, 13, 14, 15, 18, 22, 23, 24, 27, 29, 35, 36, 38, 39, 46, 49, 51, 52, 54, 59, 68, 69, 70, 73, 78, 82, 102, 104, 109, 112 |
| C.I. basic blue | 1, 3, 5, 7, 9, 21, 22, 26, 35, 41, 45, 47, 54, 62, 65, 66, 67, 69, 75, 77, 78, 89, 92, 93, 105, 117, 120, 122, 124, 129, 137, 141, 147, 155 |
| C.I. basic black | 2, 8 |
| (d) As reactive dye | |
| C.I. reactive black | 3, 4, 7, 11, 12, 17 |
| C.I. reactive yellow | 1, 5, 11, 13, 14, 20, 21, 22, 25, 40, 47, 51, 55, 65, 67 |
| C.I. reactive red | 1, 14, 17, 25, 26, 32, 37, 44, 46, 55, 60, 66, 74, 79, 96, 97 |
| C.I. reactive blue | 1, 2, 7, 14, 15, 23, 32, 35, 38, 41, 63, 80, 95 |

The treatment liquid under the present invention includes a particle. The particle may be an organic material, an inorganic material, or an organic-inorganic compound material. Particle configuration is not particularly limited, namely, any of sphere, bead (moniliform) or irregularity is allowed.

Examples of the organic material include polystyrene, styrene-acrylic copolymer, polymethyl methacrylate, melamine resin, epoxy resin, silicon resin, benzoguanamine resin, polyamide resin, fluorine resin, and a polymer obtained by emulsion-polymerization and the like of α,β-unsaturated ethylene monomer, and the like.

Examples of the inorganic material are largely categorized into: i) an inorganic salt such as calcium carbonate and ii) an inorganic oxide such as silica ($SiO_2$).

Specific examples of the inorganic salt include calcium carbonate, calcium nitrate, calcium chloride, calcium sulfate, aluminum nitrate, aluminum chloride, aluminum sulfate, iron sulfate and the like, but not limited to these. For use as an aqueous treatment liquid, calcium carbonate, calcium nitrate, iron sulfate and the like having low solubility in water are preferable for easily obtaining a dispersion body. Moreover, subjecting the above to cationization treatment may further increase absorption capability and aggregation capability of the colorant, which is more preferable. A method for improving quality by cationic agent is proposed in a conventional technology (Japanese Patent Application Laid-Open (JP-A) No. 10-129113, Japanese Patent Application Laid-Open (JP-A) No. 11-20301, and the like) but not limited to these.

Specific examples of the inorganic oxide include silica ($SiO_2$), cationized silica, titanium dioxide, alumina ($Al_2O_3$) and the like, but not limited to these.

The cationic particle under the present invention can be used provided that at least a surface of the particle be cationic. Examples of cationic particle include cationic silica (cationized silica ($SiO_2$)), alumina ($Al_2O_3$), titanium dioxide, polymer particle introducing cationic group, and the like. Particularly, the cationic particle under the present invention shows a good absorption-aggregation when combined with an anionic colorant, thus showing high effect for improving image quality. In terms of reactivity, cationic silica is particularly preferable among the cationic particles. Cationic silica is usable provided that at least a surface of the silica be cationized. Cationizing is achieved by chemically and physically introducing cationic compound on the surface of the silica. For example, the chemical treatment of the surface can be carried out by coupling amino compound with silica's silanol group, or by reacting aluminum compound with the silica's silanol group. Moreover, mixing silica with cationic compound in a solvent to thereby physically absorb the cationic compound, and then removing the solvent can achieve the physical treatment of the surface. In this case, specific examples of the anionic silica used as a core material include: ST-ZL, ST-20, ST-30, ST-40, ST-C, ST-N, ST-O, ST-S, ST-50, ST-20L, ST-OL, ST-XS, ST-YL, ST-XL, ST-UP, ST-OUP (made by Nissan Chemical Industries, Ltd.), Cataloid SI-350, SI-500 (made by DuPont), Nipgel AY-220, AY-420, AY-460 (made by Nippon silica) and the like. Not limited to the above methods, those having silica surface thereof cationized can be preferably used.

Cationic particle can be obtained as product. Examples of cationized product of silica include ST-AK (made by Nissan Chemical Industries, Ltd.). Examples of alumina product include Alumina sol 100, 200, 520 (made by Nissan Chemical Industries, Ltd.) and the like. Examples of titanium dioxide product include Titania Series (made by Idemitsu Kosan Co. Ltd.). Some of the above products can be used as a water dispersion body.

The particle under the present invention may be a cationic inorganic-organic compound provided that it be shaped into a particle. A plurality of cationic particles can be used in combination.

The cationic inorganic-organic compound particle may be obtained by absorbing cationic organic material to a surface of an inorganic particle, or oppositely, by absorbing cationic inorganic material to a surface of an organic material. For example, an inorganic-organic compound particle that is coated with cationic high molecular material can be obtained by dispersing an inorganic particle in a solvent such as water and the like, and then gradually adding thereto cationic high molecular material in a form of water or water-soluble organic solvent.

Specific examples of cationic high molecular material include polyallylamine, polyvinylamine, polyimine, polyvinyl pyrolidone, polyethylene imine, polyvinyl pyridine, aminoacetal polyvinyl alcohol, ionene polymer, polyvinyl imidazole, polyvinyl benziklphosphonium, polyalkylallyl ammonium, polyamidine, polyamine sulfone, cation starch, and the like.

Particle added is preferably from about 0.01 weight % to 50 weight % of the treatment liquid, more preferably from about 1 weight % to 30 weight %. Particle content of 0.01 weight % or less may fail to achieve a sufficient effect of image improvement, while particle content of 50 weight % or more may fail to obtain a sufficient discharge stability. Hereinabove, a plurality of cationic particles can be used in combination.

Average particle diameter is preferably 500 nm or less, more preferably 200 nm or less from the viewpoint of discharge stability. The average particle diameter of 500 nm or more is likely to cause clogging of a discharge head, leading to discharge failure.

The average particle diameter can be measured with an optical particle distribution meter, showing a particle diameter of particle number 50%.

The particle becomes the treatment liquid after being dispersed by a vehicle having a main component of water. When dispersing the particle, peptizer is preferably used for stabilizing the dispersion. The peptizer can stabilize dispersion by forming electric double layers on a surface of charged particle in such a manner that the electric double layers electrostatically repulse for preventing approach of the particle. The particle is positively charged from neutral to acid, therefore anion sources are used as the peptizer such as acetic acid, nitric acid, hydrochloric acid, formic acid, lactic acid, alkali metal salts thereof, zirconium compound such as zirconium oxychloride hydrate, sodium pyrophosphate, sodium hexametaphosphate, taurine, and the like, but not limited thereto.

The treatment liquid under the present invention can be produced by the following method. A particle, water, and peptizer are mixed to prepare a dispersion liquid. When necessary, a water-soluble solvent is added to the dispersion liquid and then the thus obtained is peptized with a peptizing machine. Examples of the above peptizer include a high speed rotary high shear type stirring peptizing machine, a dissolver, a colloid mill, a homogenizer, an ultrasonic peptizing machine, and the like. Specifically, T. K. Auto Homomixer, T. K. Homomic Line Flow, Ultra Homomixer, NNK collide mill, and the like. Rotation during peptization may vary with types or constitutions of the peptizing machines, but is preferably from 500 rpm to 10000 rpm, more preferably from 2000 rpm to 8000 rpm. Temperature during peptization is preferably from 5° C. to 100° C. Peptization time may vary with types or constitutions of the peptizing machines, but is preferably from 0.01 hours to 48 hours.

For allowing the treatment liquid and the recording liquid to have desired properties, or for preventing the clogging of a nozzle of the record head which may be caused by drying, a water-soluble organic solvent is preferably to be used. The water-soluble organic solvent may include humectant and penetrant. The humectant is to be added so as to prevent the clogging of the nozzle of the record head which may be caused by the drying. Specific examples of the humectant include polyatomic alcohols such as ethylene glycol, diethylene glycol, triethylene glycol, tetraethylene glycol, polyethylene glycol, propylene glycol, 1,3-butanediol, 1,3-propanediol, 2-methyl-1,3-propanediol, 1,4-butanediol, 1,5-pentanediol, 1,6-hexanediol, glycerin, 1,2,6-hexanetriol, 2-ethyl-1,3-hexanediol, 1,2,4-butanetriol, 1,2,3-butanetriol, petriol, and the like; alkyl ethers of polyatomic alcohols such as ethylene glycol monoethyl ether, ethylene glycol monobutyl ether, diethylene glycol monomethyl ether, diethylene glycol monoethyl ether, diethylene glycol monobutyl ether, triethylene glycol monobutyl ether, tetraethylene glycol monomethyl ether, propylene glycol monoethyl ether, and the like; aryl ethers of polyatomic alcohols such as ethylene glycol monophenyl ether, ethylene glycol monobenzil ether, and the like; nitrogen-including heterocyclic compounds such as N-methyl-2-pyrolidone, N-hydroxyethyl-2-pyrolidone, 2-pyrolidone, 1,3-dimethyl imidazolidinone, ε-caprolactam, and the like; amides such as formamide, N-methyl formamide, formamide, N,N-dimethyl formamide, and the like; amines such as monoethanol amine, diethanol amine, triethanol amine, monoethyl amine, diethyl amine, triethyl amine, and the like; sulfur compounds such as dimethyl sulfoxide, sulfolane, thiodiethanol, and the like; propylene carbonate, ethylene carbonate, γ-butyrolactone; and the like. The above solvents may be used alone or in combination.

The penetrant is added for the purpose of improving wetting state of the treatment liquid with the recording medium or wetting state of the recording liquid with the recording medium, to thereby adjust penetration rate. As the penetrant, those given by the following formula (I) to formula (IV) are preferable. Specifically, polyoxyethylene alkylphenylether surfactant in the formula (I), acetylene glycol surfactant in the formula (II), polyoxyethylene alkylether surfactant in the formula (III), and polyoxyethylene polyoxypropylene alkylether surfactant in the formula (IV) which are capable of decreasing surface tension of the liquid, thereby improving the wetting state and increasing penetration rate.

Formula (I)

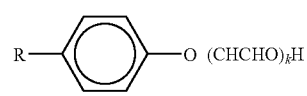

(R is a hydrocarbon chain of carbon atoms 6 to 14 which may be branched, k: 5 to 20)

Formula (II)

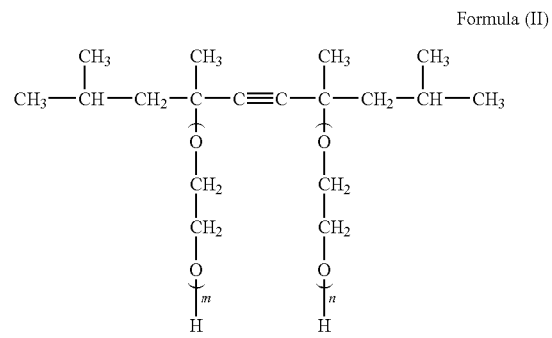

(m, n: 0 to 40)

Formula (III)

(R is a hydrocarbon chain of carbon atoms 6 to 14 which may be branched)

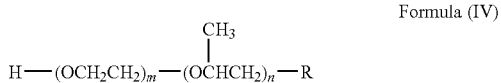

Formula (IV)

(R is a hydrocarbon chain of carbon atoms 6 to 14, m and n: 20 or less)

Examples of usable compounds other than those in the above formula (I) to formula (IV) include alkyl ethers and aryl ethers of polyatomic alcohols such as diethylene glycol monophenyl ether, ethylene glycol monophenyl ether, ethylene glycol monoallyl ether, diethylene glycol monophenyl ether, diethylene glycol monobutyl ether, propylene glycol monobutyl ether, tetraethylene glycol chlorophenyl ether, and the like; nonion surfactant such as polyoxyethylene polyoxypropylene block copolymer and the like; fluorine surfactant; lower alcohols such as ethanol, 2-propanol, and the like. Particularly preferable is diethylene glycol monobutyl ether.

The treatment liquid under the present invention may include a cationic surfactant such as quaternary ammonium salt, pyridinium salt, imidazoline-type compound, and the like. Specifically, examples include lauryl trimethyl ammonium chloride, lauryl dimethyl benzil ammonium chloride, benzil tributyl ammonium chloride, benzalkonium chloride, cetylpyridinium chloride, 2-hepta decenyl hydroxy ethyl imidazoline, and the like.

The cationic surfactant can increase wetting state with the printed materiel by decreasing surface tension to thereby accelerate formation of the particle layer, and can aggregate the anionic colorant. With this, the cationic surfactant is effective for improving image quality.

The treatment liquid and the recording liquid under the present invention can include a first antiseptic (preventing corrosion) and a second antiseptic (preventing mold). Including the antiseptics can suppress prosperity of fungus, to thereby increase preservability stability and image stability. Examples of the antiseptics include sodium dehydroacetate, sodium sorbate, 2-pyridinethiol-1-oxide sodium, isothiazoline compound, sodium benzoate, pentachlorophenol sodium, and the like.

The treatment liquid and the recording liquid under the present invention can include rust preventive. Including the rust preventive can prevent metal rust on a surface of head and the like which surface contacting the liquid. Examples of the rust preventive include acid sulfite, sodium thiosulfate, ammonium thiodiglycolate, diisopropyl ammonium nitrite, pentaerythritol tetranitrate, dicyclohexylamine ammonium nitrite, and the like.

Examples of pH adjuster include hydrides of alkali metal elements such as lithium hydroxide, sodium hydroxide, potassium hydroxide, and the like; ammonium hydroxide; quaternary ammonium hydroxide; quaternary phosphonium hydroxide; carbonates of alkali metal such as lithium carbonate, sodium carbonate, potassium carbonate, and the like; amines such as diethanol amine, triethanol amine, and the like; boric acid; hydrochloric acid; nitric acid; acetic acid; and the like.

Viscosity of the treatment liquid can be adjusted by varying density of cationic particle, density of water-soluble solvents such as humectant, penetrant and the like, density of the second antiseptic (preventing mold), density of the first antiseptic (preventing corrosion). At least one of the treatment liquid and the recording liquid included in the ink set under the present invention preferably has viscosity of 5 mPa·sec or more. Adjusting the density of the above additives can bring about the desired viscosity.

Hereinafter, the ink-jet printing method and an ink-jet printer carrying out the method are described, referring to the drawings.

Figure 2:
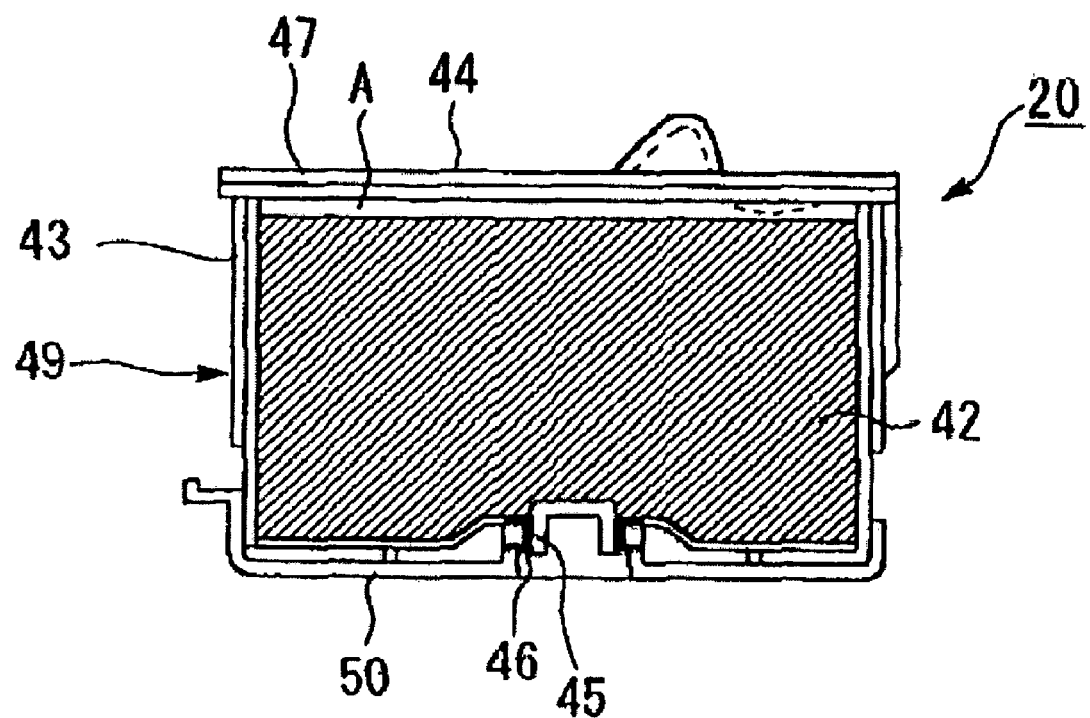
FIG. 2 is a cross sectional front view of the cartridge which is capable of receiving therein the recording liquid and the treatment liquid under the present invention.

FIG. 1 and FIG. 2 show a constitution of a cartridge which is capable of receiving therein the recording liquid and the treatment liquid under the present invention. FIG. 1 shows an external perspective view of the cartridge, while FIG. 2 shows a cross sectional front view of the cartridge. A cartridge (20), as is seen in FIG. 2, has a cartridge body (49) receiving therein an absorption body (42) for absorbing the recording liquid or the treatment liquid. The cartridge body (49) is formed in such a manner that an upper cover member (44) is adhered or welded to an upper large opening of a case (43). The cartridge body (49) is formed, for example, through resin molding. The absorption body (42) is made of porous body such as urethane foam body and the like. After being compressively inserted to the cartridge body (49), the absorption body (42) may absorb the recording liquid or the treatment liquid.

The case (43) of the cartridge body (49) has a base section which is formed with a supply port (45) for supplying the recording liquid or the treatment liquid to a record head. A seal ring (46) mates with an inner periphery of the supply port (45). The upper cover member (44) is formed with an atmospheric opening (47).

A cap member (50) is mounted to the cartridge body (49). The cap member (50) may prevent leak of the inside recording liquid or the inside treatment liquid which leak may be caused by a compressive deformation of the case (43) in the following state: i) before loading and when the supply port (45) is blocked, handling the cartridge for loading or transportation, or ii) when a pressure is applied to a wide sidewall during vacuum packing.

As is seen in FIG. 1, the atmospheric opening (47) is sealed by sealing to the upper cover member (44) a film-shaped seal member (55) which has oxygen permeability of 100 ml/M² or more. The seal member (55) has such a dimension as to seal the atmospheric opening (47) and a plurality of grooves (48) which are formed around the atmospheric opening (47). Sealing the atmospheric opening (47) with the seal member (55) having the oxygen permeability of 100 ml/m² or more may bring about the following effect:

Effect)

Even in the following state i), with the cartridge (20) packed under a decreased pressure using a pack member made of an aluminum laminate film and the like that is free from air permeability, and with the recording liquid or the treatment liquid being loaded:

state i) an atmosphere present in a space A (see FIG. 2) that is formed between the absorption body (42) and the cartridge body (49) causes air to be dissolved in the recording liquid or the treatment liquid;

the air in the recording liquid or the treatment liquid can be exhausted via the seal member (55) to a space {between the cartridge body (49) and the pack member which is disposed outside the cartridge body (49)} having a high degree of vacuum, thus improving degassing of the recording liquid or the treatment liquid.

Alternatively, the cartridge can be integrated with the record head.

Hereinafter, the ink-jet printing method and the ink-jet printer carrying out this method are described, referring to the drawings.

Figure 3:
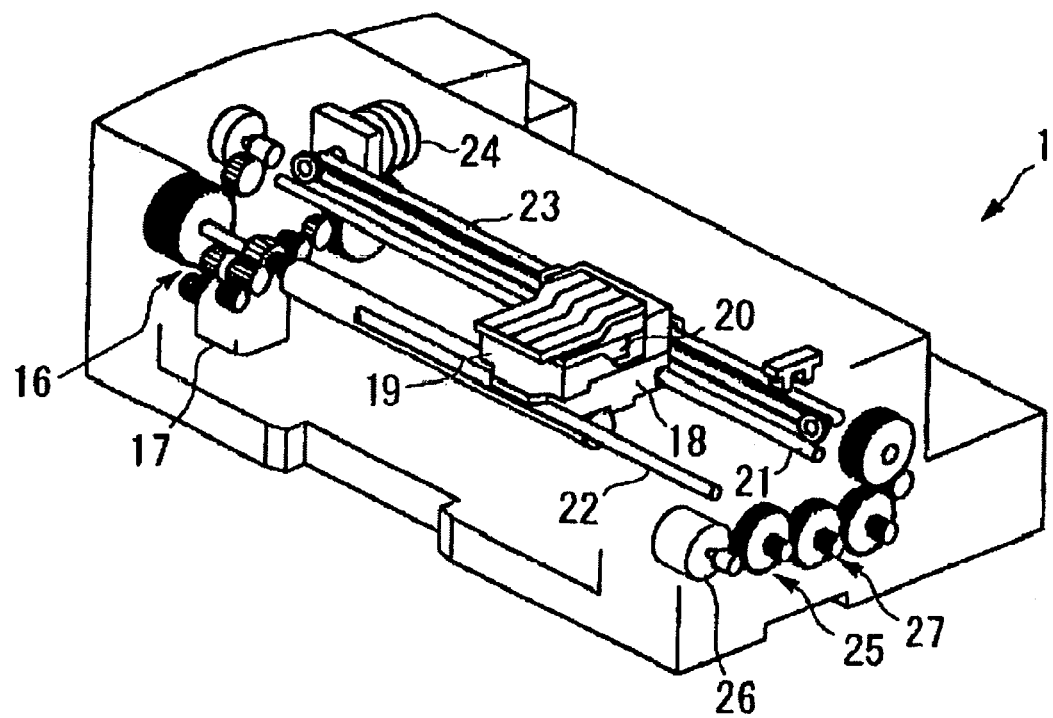
FIG. 3 shows an example of a constitution of an ink-jet printer under the present invention.

FIG. 3 shows an example of a constitution of the ink-jet printer under the present invention. In an ink-jet printer (1), the treatment liquid and the recording liquid are received in the cartridge (20), and the treatment liquid and the recording liquid may be supplied to a record head (18) from the cartridge (20). Herein, the cartridge (20) is mounted in such a state that the one for the treatment liquid and the ones for the recording liquids (for different colors) can be separated. The recording liquid and the treatment liquid which are used are described above, therefore repeated explanation of the same is to be omitted.

The record head (18) is mounted to a carriage (19). Being guided by a guide shaft (21) and a guide shaft (22), the record head (18) is moved by a timing belt (23) that is driven by a main scanning motor (24). On the other hand, a recording medium that is conveyed by a main scanning motor (25), a main scanning motor (26) and a main scanning motor (27) and is controlled (conveyed) by a sub-scanning motor (17) via a gear (16) is placed in a position opposite to the record head (18) by means of a platen.

Figure 4:
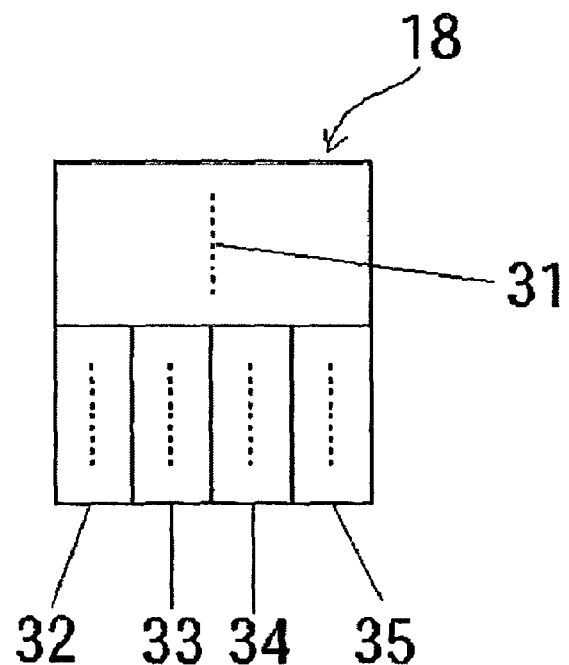
FIG. 4 is an enlarged view of a nozzle face of a record head.

FIG. 4 is an enlarged view of a nozzle face of the record head (18). A nozzle (31) discharging the treatment liquid is disposed longitudinally. A nozzle (32), a nozzle (33), a nozzle (34) and nozzle (35), respectively, discharge a yellow recording liquid, a magenta recording liquid, a cyanogen recording liquid, and a black recording liquid.

Figure 5:
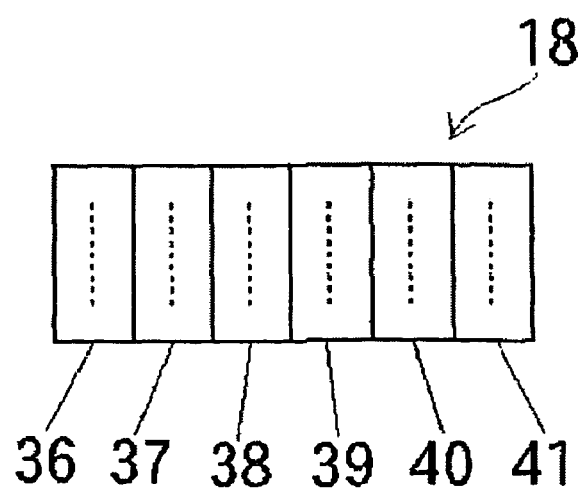
FIG. 5 is an enlarged view of a nozzle face of a record head.

FIG. 5 shows another constitution of the nozzle face. As is seen in FIG. 5, all the nozzles can be arranged laterally. FIG. 5 shows a nozzle (36) and a nozzle (41) for discharging the treatment liquid, and a nozzle (37), a nozzle (38), a nozzle (39), and nozzle (40) for discharging, respectively, the yellow recording liquid, the magenta recording liquid, the cyanogen recording liquid, and the black recording liquid. In the record head (18) according to the above aspect having the treatment liquid discharging nozzles disposed respectively at a left end and a right end, printing can be carried out both on a forward way and a backward way of the record head (18) on the carriage (19). In other words, the treatment liquid may be adhered first either on the forward way or the backward way, followed by adhering of the color recording liquid(s) on the treatment liquid, or vice versa, thereby causing no image density difference attributable to moving direction of the record head (18).

Herein, the recording liquid and the treatment liquid which are discharged from the record head (18) are most preferably to be overlapped in the same portion. The present invention is, however, not limited to this. For example, the following cases are included within the scope of the present invention: applying (namely, thinning) the treatment liquid which thereafter is expanded by exudation and the like, and is overlapped with the recording liquid, or only a profile of the image makes a partly overlapping of the treatment liquid with the recording liquid.

Moreover, an ink-jet record article which is produced in the ink-jet printing method using the ink set including the recording liquid and the treatment liquid under the present invention has a very good image that is free from feathering or color bleeding, and is excellent in waterproof and light resistance. Particularly, even when a plain paper sheet is used for the recording medium, the ink-jet record article can have high quality image.

Hereinafter, more detailed explanation is to be made according to examples.

Production Example 1 of Resin-Coated Type Pigment (Preparation of Resin-Coated Type Pigment)

(1) Preparation of Polymer Solution

A flask of 1 L provided with a mechanical stirrer, a thermometer, a nitrogen gas intruding tube, a rotary flow tube and a droplet funnel was subjected to a sufficient nitrogen gas substitution. Then, styrene 11.2 g, acrylic acid 2.8 g, lauryl methacrylate 12.0 g, polyethylene glycol methacrylate 4.0 g, styrene macromer (AS-6 made by Toagosei Co., Ltd.) 4.0 g, mercaptoethanol 0.4 g are introduced, and temperature was increased to 65° C.

Then, a mixture of styrene 100.8 g, acrylic acid 25.2 g, lauryl methacrylate 108.0 g, polyethylene glycol methacrylate 36.0 g, hydroxy ethyl methacrylate 60.0 g, styrene macromer (AS-6 made by Toagosei Co., Ltd.) 36.0 g, mercaptoethanol 3.6 g, azobis dimethyl valeronitrile 2.4 g and methylethylketone 18 g was dropped in the flask for 2.5 hours.

After the dropping was completed, a mixture of azobis dimethyl valeronitrile 0.8 g and methylethylketone 18 g was dropped in the flask for 0.5 hours. After maturing for 1 hour at 65° C., azobis dimethyl valeronitrile 0.8 g was added, then matured for another 1 hour.

After the reaction was completed, methylethylketone 364 g was added into the flask, to thereby obtain polymer solution 800 g having density of 50%.

Part of the polymer solution was dried, and then measured with a gel permeation chromatography (standard: polystyrene, solvent: tetrahydrofuran), to obtain a weight average molecular weight of 15000.

(2) Preparation of Resin-Coated Type Black Pigment

The polymer solution 22.2 g obtained in paragraph (1), carbon black (Monarch 880 made by Cabot) 26.0 g, 1 mol/L of potassium hydroxide solution 13.6 g, methylethylketone 20 g, and ion exchanged water 30 g were sufficiently stirred, and then were mixed with three roll mills (NR-84A made by Noritake Company).

The thus obtained paste was input into ion exchanged water 200 g, and then was stirred sufficiently, and then methylethylketone and water were distilled with an evaporator, to thereby obtain resin-coated type black pigment 160 g (recording liquid including resin-coated type carbon black in an amount of 20.0 weight % in terms of solid content).

Production example 2 of resin-coated type pigment (Preparation of resin-coated type yellow pigment)

Paragraph (2) in the Production example 1 was repeated, except that the carbon black was replaced with yellow pigment (Symuler Fast Yellow 4181 made by Dainippon Ink and Chemicals, Incorporated.), to thereby obtain resin-coated type yellow pigment.

<Production 1 of Recording Liquid>

Components of each of the following recording liquids were mixed, and then were filtered by a polytetrafluoroethylene fluorine resin filter of 0.8 μm, to thereby produce each recording liquid.

(1) Recording liquid 1 (used for each example; black, resin-coated type)

| | |
|---|---|
| Resin-coated type black pigment | 10.0 weight part |
| (Of 10.0 weight part, resin is 3.0 weight part.) | |
| 1,3-butanediol | 22.5 weight part |
| Glycerin | 7.5 weight part |
| Surfactant (I) | 1.0 weight part |
| 2-pyrolidone | 2.0 weight part |
| Sodium dehydroacetate | 0.2 weight part |
| Sodium thiosulfate | 0.2 weight part |
| Ion exchanged water | Balance |

(2) Recording Liquid 2 (Used for Comparative Example 1; Black, Self-Dispersion Type)

| | |
|---|---|
| Cabojet 300 (made by Cabot, self-dispersion type pigment) | 10.0 weight part |
| 1,3-butanediol | 22.5 weight part |
| Glycerin | 7.5 weight part |
| Surfactant (I) | 1.0 weight part |
| 2-pyrolidone | 2.0 weight part |
| Sodium dehydroacetate | 0.2 weight part |
| Sodium thiosulfate | 0.2 weight part |
| Ion exchanged water | Balance |

(3) Recording Liquid 3 (Used for Comparative Example 2; Black, Self-Dispersion Type+Acrylic Emulsion Added)

| | |
|---|---|
| Cabojet 300 (made by Cabot, self-dispersion type pigment) | 10.0 weight part |
| Acrylic resin emulsion (made by Avecia) | 5.0 weight part |
| 1,3-butanediol | 22.5 weight part |
| Glycerin | 7.5 weight part |
| Surfactant (I) | 1.0 weight part |
| 2-pyrolidone | 2.0 weight part |
| Sodium dehydroacetate | 0.2 weight part |
| Sodium thiosulfate | 0.2 weight part |
| Ion exchanged water | Balance |

(4) Recording Liquid 4 (Used for Comparative Example 3 and Comparative Example 4; Black, Dye Type)

| | |
|---|---|
| C.I. food black 2 | 3.0 weight part |
| Glycerin | 10.0 weight part |
| Ethylene glycol | 15.0 weight part |
| Diethylene glycol | 24.0 weight part |
| Diethylene glycol monobutyl ether | 4.0 weight part |
| Sodium dehydroacetate | 0.3 weight part |
| Ion exchanged water | Balance |

(5) Recording Liquid 5 (Used for Comparative Example 5; Black, Dye Type)

| | |
|---|---|
| C.I. food black 2 | 3.0 weight part |
| Glycerin | 5.0 weight part |
| Ethylene glycol | 5.0 weight part |
| Diethylene glycol | 15.0 weight part |
| N-methyl-2-pyrolidone | 2.0 weight part |
| Diethylene glycol monobutyl ether | 3.0 weight part |
| Sodium dehydroacetate | 0.3 weight part |
| Ion exchanged water | Balance |

(6) Recording Liquid 6 (Used for Comparative Example 6; Black, Dye Type)

| | |
|---|---|
| Direct black 195 | 2.5 weight part |
| 2-pyrolidone | 10.0 weight part |
| Glycerin | 5.0 weight part |
| Isopropyl alcohol | 4.0 weight part |
| NaOH | 0.4 weight part |
| Ion exchanged water | Balance |

(7) Recording Liquid 11 (Used for Each Example; Yellow, Resin-Coated Type)

| | |
|---|---|
| Resin-coated type yellow pigment (Of 10.0 weight part, resin is 3.0 weight part.) | 10.0 weight part |
| 1,3-butanediol | 22.5 weight part |
| Glycerin | 7.5 weight part |
| Surfactant (I) | 1.0 weight part |
| 2-pyrolidone | 2.0 weight part |
| Sodium dehydroacetate | 0.2 weight part |
| Sodium thiosulfate | 0.2 weight part |
| Ion exchanged water | Balance |

(8) Recording Liquid 12 (Used for Comparative Example 1; Yellow, Self-Dispersion Type)

| | |
|---|---|
| C.I. pigment yellow 17 (self-dispersion type) | 10.0 weight part |
| 1,3-butanediol | 22.5 weight part |
| Glycerin | 7.5 weight part |
| Surfactant (I) | 1.0 weight part |
| 2-pyrolidone | 2.0 weight part |
| Sodium dehydroacetate | 0.2 weight part |
| Sodium thiosulfate | 0.2 weight part |
| Ion exchanged water | Balance |

(9) Recording Liquid 13 (Used for Comparative Example 2; Yellow, Self Dispersion Type+Acrylic Emulsion Added)

| | |
|---|---|
| C.I. pigment yellow 17 (self-dispersion type) | 10.0 weight part |
| Acrylic resin emulsion (made by Avecia) | 5.0 weight part |
| 11,3-butanediol | 22.5 weight part |
| Glycerin | 7.5 weight part |
| Surfactant (I) | 1.0 weight part |
| 2-pyrolidone | 2.0 weight part |
| Sodium dehydroacetate | 0.2 weight part |
| Sodium thiosulfate | 0.2 weight part |
| Ion exchanged water | Balance |

(10) Recording Liquid 14 (Used for Comparative Example 3 and Comparative Example 4; Yellow, Dye Type)

| | |
|---|---|
| C.I. acid yellow 23 | 3.0 weight part |
| Glycerin | 10.0 weight part |
| Ethylene glycol | 15.0 weight part |
| Diethylene glycol | 24.0 weight part |
| Diethylene glycol monobutyl ether | 4.0 weight part |
| Sodium dehydroacetate | 0.3 weight part |
| Ion exchanged water | Balance |

(11) Recording Liquid 15 (Used for Comparative Example 5; Yellow, Dye Type)

| | |
|---|---|
| C.I. acid yellow 23 | 3.0 weight part |
| Glycerin | 5.0 weight part |
| Ethylene glycol | 5.0 weight part |
| Diethylene glycol | 15.0 weight part |
| N-methyl-2-pyrolidone | 2.0 weight part |
| Diethylene glycol monobutyl ether | 3.0 weight part |
| Sodium dehydroacetate | 0.3 weight part |
| Ion exchanged water | Balance |

(12) Recording Liquid 16 (Used for Comparative Example 6; Yellow, Dye Type)

| | |
|---|---|
| Projet Fast Yellow 2 | 2.0 weight part |
| Direct yellow 86 | 1.0 weight part |
| β-thiodiglycol | 8.0 weight part |
| Ethylene glycol | 8.0 weight part |
| Acetynol EH (Kawaken Fine Chemicals) | 0.2 weight part |
| Isopropyl alcohol | 4.0 weight part |
| Ion exchanged water | Balance |

<Production 1 of Treatment Liquid>

Components of each of the following treatment liquids were mixed, and then were filtered by a polytetrafluoroethylene fluorine resin filter of 0.8 μm, to thereby produce each treatment liquid.

(1) Treatment Liquid 1 (Used for Example 1)

| | |
|---|---|
| Polyallylamine coated silica | 15.0 weight part |
| Glycerin | 10.0 weight part |
| Surfactant (I) | 1.0 weight part |
| 2-ethyl-1,3-hexanediol | 2.0 weight part |
| Sodium dehydroacetate | 0.2 weight part |
| Sodium thiosulfate | 0.2 weight part |
| Ion exchanged water | Balance |

(2) Treatment Liquid 2 (Used for Example 2)

| | |
|---|---|
| Alumina (Alumina sol 520 made by Nissan Chemical Insudtries, Ltd.) | 15.0 weight part (solid) |
| Glycerin | 10.0 weight part |
| Surfactant (I) | 1.0 weight part |
| 2-ethyl-1,3-hexanediol | 2.0 weight part |
| Sodium dehydroacetate | 0.2 weight part |
| Sodium thiosulfate | 0.2 weight part |
| Ion exchanged water | Balance |

(3) Treatment Liquid 3 (Used for Example 3)

| | |
|---|---|
| Cationic silica (ST-AK made by Nissan Chemical Industries, Ltd.) | 15.0 weight part (solid) |
| Glycerin | 10.0 weight part |
| Surfactant (I) | 1.0 weight part |
| 2-ethyl-1,3-hexanediol | 2.0 weight part |
| Sodium dehydroacetate | 0.2 weight part |
| Sodium thiosulfate | 0.2 weight part |
| Ion exchanged water | Balance |

(4) Treatment Liquid 4 (Used for Example 4, Comparative Example 1, and Comparative Example 2)

| | |
|---|---|
| Cationic silica (ST-AK made by Nissan Chemical Industries, Ltd.) | 15.0 weight part (solid) |
| Glycerin | 10.0 weight part |
| Surfactant (I) | 1.0 weight part |
| 2-ethyl-1,3-hexanediol | 2.0 weight part |
| Cation G50 (cationic surfactant made by Sanyo Chemical Industries, Ltd.) | 4.0 weight part |
| Sodium dehydroacetate | 0.2 weight part |
| Sodium thiosulfate | 0.2 weight part |
| Ion exchanged water | Balance |

(5) Treatment Liquid 5 (Used for Comparative Example 3)

| | |
|---|---|
| Polyallylamine | 5.0 weight part |
| Glycerin | 10.0 weight part |
| Ethylene glycol | 11.0 weight part |
| Diethylene glycol | 20.0 weight part |
| Diethylene glycol monobutyl ether | 12.0 weight part |
| Sodium dehydroacetate | 0.1 weight part |
| Ion exchanged water | Balance |

(6) Treatment Liquid 6 (Used for Comparative Example 4)

| | |
|---|---|
| $Al(NO_3)_3 \cdot 9H_2O$ | 5.0 weight part |
| Glycerin | 10.0 weight part |
| Ethylene glycol | 11.0 weight part |
| Diethylene glycol | 20.0 weight part |
| Diethylene glycol monobutyl ether | 12.0 weight part |
| Sodium dehydroacetate | 0.1 weight part |
| Ion exchanged water | Balance |

(7) Treatment Liquid 7 (Used for Comparative Example 5) Quaternary Ammonium Compound

| | |
|---|---|
| (Cation G50 made by Sanyo Chemical Industries, Ltd.) | 5.0 weight part |
| Glycerin | 10.0 weight part |
| Diethylene glycol | 20.0 weight part |
| Ion exchanged water | Balance |

(8) Treatment Liquid 8 (Used for Comparative Example 6)

| | |
|---|---|
| Cationic silica (ST-AK made by Nissan Chemical Industries, Ltd.) | 15.0 weight part |
| Glycerin | 7.5 weight part |
| Diethylene glycol | 7.5 weight part |
| Nitric acid | 0.6 weight part |
| Ion exchanged water | Balance |

<Image Quality Evaluation 1>

Image quality of print was evaluated in the following manner.

(1) Feathering

An image quality was evaluated by observing a black character portion and comparing it with a rank sample.

| | |
|---|---|
| Rank 5: | No feathering is found. |
| Rank 4: | Very few featherings are found. |
| Rank 3: | Feathering are found but are not practically problematical. |
| Rank 2: | A fair amount of featherings are found. |
| Rank 1: | Many featherings are found. |

(2) Color Bleeding

An image quality was evaluated by observing a boundary portion between a black solid image and a yellow solid image and comparing it with a rank sample.

| Rank 5: | No mixed color is found. |
| Rank 4: | Very few mixed colors are found. |
| Rank 3: | Mixed colors are found but are not practically problematical. |
| Rank 2: | A fair amount of mixed colors are found. |
| Rank 1: | Many mixed colors are found. |

(3) Wear Resistance 1 hour after the printing was completed, the black solid image portion was rubbed by finger, so as to check for ink transfer to the finger.

(4) Image Density and Back-Through Density

An optical density was measured from a surface of the black solid image portion and from a backface of the black solid image portion, to thereby obtain respectively an image density and a back-through density.

(5) Dryness

Immediately after the printing was completed, a plain paper sheet (My paper made by NBS Ricoh Co., Ltd.) was pressed to a print, so as to check for ink transfer of the black solid image portion to the plain paper sheet.

(6) Waterproof

After being dipped in ion exchanged water for 1 minute, the print was taken out, and water adhesion was absorbed with a paper towel for natural dry. Density of the black solid image was measured before and after the dipping, and change ratio was determined as a fading ratio.

(7) Discharge Stability

Print was observed, and was checked for discharge failure based on whether or not image defect was found.

(8) Glossiness

60° glossiness of print was measured with a glossiness meter (4501 made by BYK Gardner).

<Viscosity Measurement 1>

The recording liquid and the treatment liquid thus produced were measured for viscosity at 25° C. with a rotary R-type viscosimeter (Series 500 made by TOKI SANGYO CO., LTD.).

EXAMPLE 1

A treatment liquid cartridge was loaded with a treatment liquid 1, a yellow recording liquid cartridge was loaded with a yellow recording liquid 1, and a black recording liquid cartridge was loaded with a black recording liquid 1, thereafter the above cartridges were mounted to an ink-jet printer in FIG. 3, to thereby carry out a print evaluation. My paper (plain paper sheet made by NBS Ricoh Co., Ltd.) was used for a recording medium for carrying out a print test. Printing was carried out in such an order that the treatment liquid was adhered at first to the paper sheet, and subsequently the recording liquids of various colors were adhered on the treatment liquid.

The print after the test was evaluated on feathering, color bleeding, wear resistance, image density, back-through density, dryness, and waterproof. The results are shown in Table 2.

EXAMPLE 2 to EXAMPLE 5

Print tests in the example 1 were repeated, except that the treatment liquid 1, the black recording liquid 1 and the yellow recording liquid 1 in the example 1 were replaced respectively with those shown in Table 1. Test results are shown in Table 2.

Comparative Example 1 to Comparative Example 6

Print tests in the example 1 were repeated, except that the treatment liquid 1, the recording liquid 1 and the recording liquid 11 in the example 1 were replaced respectively with those shown in Table 1. Test results are shown in Table 2.

TABLE 1

| | Black recording liquid | | Yellow recording liquid | | Treatment liquid | |
| --- | --- | --- | --- | --- | --- | --- |
| | No. & type | Viscosity | No. & type | Viscosity | No. & type | Viscosity |
| Example 1 | Recording liquid 1 (resin-coated type) | 8.25 | Recording liquid 11 (resin-coated type) | 8.21 | Treatment liquid 1 (polyallylamine coated $SiO_2$ + glycerin 10% + surfactant (I)) | 5.22 |
| Example 2 | Recording liquid 1 (resin-coated type) | 8.25 | Recording liquid 11 (resin-coated type) | 8.21 | Treatment liquid 2 (alumina + glycerin 10% + surfactant (I)) | 4.48 |
| Example 3 | Recording liquid 1 (resin-coated type) | 8.25 | Recording liquid 11 (resin-coated type) | 8.21 | Treatment liquid 3 (cationic silica + glycerin 10% + surfactant (I)) | 5.02 |
| Example 4 | Recording liquid 1 (resin-coated type) | 8.25 | Recording liquid 11 (resin-coated type) | 8.21 | Treatment liquid 4 (cationic silica + glycerin 10% + surfactant (I)) | 5.20 |
| Comparative example 1 | Recording liquid 2 (self-dispersion type) | 8.16 | Recording liquid 12 (self-dispersion type) | 8.01 | Treatment liquid 4 (cationic silica + glycerin 10% + surfactant (I)) | 5.20 |
| Comparative example 2 | Recording liquid 3 (self-dispersion + Acrylic emulsion added) | 8.05 | Recording liquid 13 (self-dispersion + Acrylic emulsion added) | 8.09 | Treatment liquid 4 (cationic silica + glycerin 10% + surfactant (I)) | 5.20 |

TABLE 1-continued

|  | Black recording liquid | | Yellow recording liquid | | Treatment liquid | |
| --- | --- | --- | --- | --- | --- | --- |
|  | No. & type | Viscosity | No. & type | Viscosity | No. & type | Viscosity |
| Comparative example 3 | Recording liquid 4 (dye type) | 4.71 | Recording liquid 14 (dye type) | 4.75 | Treatment liquid 5 (polyallylamine + glycerin 10% + plural kind of glycols + methyl pyrolidone) | 7.46 |
| Comparative example 4 | Recording liquid 4 (dye type) | 4.71 | Recording liquid 14 (dye type) | 4.75 | Treatment liquid 6 ($Al_2O_3$ + glycerin 10% + plural kind of glycols) | 6.95 |
| Comparative example 5 | Recording liquid 5 (dye type) | 2.03 | Recording liquid 15 (dye type) | 2.11 | Treatment liquid 7 (onium salt + glycerin 10% + glycol) | 2.33 |
| Comparative example 6 | Recording liquid 6 (dye type) | 1.49 | Recording liquid 16 (dye type) | 1.53 | Treatment liquid 8 (cationic silica + glycerin 10% + DEG 5%) | 3.05 |

Remark: viscosity unit is mPa/sec.

TABLE 2

|  | Feathering rank | Bleeding rank | Wear resistance, ink transfer | O.D. | Backface density, optical density | Dryness, ink transfer | Waterproof, fading ratio | Discharge stability, discharge failure | Glossiness |
| --- | --- | --- | --- | --- | --- | --- | --- | --- | --- |
| Example 1 | 3.0 | 3.0 | Not found | 1.74 | 0.04 | Not found | 4.3% | Not found | 3.2 |
| Example 2 | 3.5 | 3.5 | Not found | 1.78 | 0.05 | Not found | 2.5% | Not found | 3.2 |
| Example 3 | 4.0 | 4.0 | Not found | 1.80 | 0.03 | Not found | 2.1% | Not found | 3.4 |
| Example 4 | 5.0 | 5.0 | Not found | 1.85 | 0.02 | Not found | 2.5% | Not found | 3.5 |
| Comparative example 1 | 3.0 | 3.0 | Found | 1.65 | 0.08 | Not found | 7.1% | Not found | 2.5 |
| Comparative example 2 | 3.0 | 3.0 | Found | 1.69 | 0.08 | Not found | 6.0% | Found | 3.0 |
| Comparative example 3 | 2.0 | 2.0 | Found | 1.43 | 0.12 | Not found | 10.5% | Not found | 1.5 |
| Comparative example 4 | 2.0 | 2.0 | Found | 1.35 | 0.15 | Not found | 11.2% | Not found | 1.4 |
| Comparative example 5 | 2.0 | 2.0 | Found | 1.32 | 0.16 | Not found | 10.3% | Not found | 1.3 |
| Comparative example 6 | 2.0 | 2.0 | Found | 1.45 | 0.12 | Not found | 10.1% | Not found | 1.8 |

<Production 2 of Recording Liquid>

Components of each of the following recording liquids were mixed, and then were filtered by a Teflon filter of 0.8 μm, to thereby produce each recording liquid.

(14) Recording Liquid 21 (Used for Comparative Example 7; Black, Self-Dispersion Type)

| | |
| --- | --- |
| Cabojet 300 (made by Cabot, self-dispersion type pigment) | 10.0 weight part |
| 1,3-butanediol | 7.5 weight part |
| Glycerin | 2.5 weight part |
| Surfactant (general formula (I)) | 1.0 weight part |
| 2-pyrolidone | 2.0 weight part |
| Sodium dehydroacetate | 0.2 weight part |
| Sodium thiosulfate | 0.2 weight part |
| Ion exchanged water | Balance |

(15) Recording Liquid 22 (Used for Example 6; Black, Self-Dispersion Type)

| | |
| --- | --- |
| Cabojet 300 (made by Cabot, self-dispersion type pigment) | 10.0 weight part |
| 1,3-butanediol | 12.0 weight part |
| Glycerin | 4.0 weight part |
| Surfactant (general formula (I)) | 1.0 weight part |
| 2-pyrolidone | 2.0 weight part |
| Sodium dehydroacetate | 0.2 weight part |
| Sodium thiosulfate | 0.2 weight part |
| Ion exchanged water | Balance |

(16) Recording Liquid 23 (Used for Example 7; Black, Self-Dispersion Type)

| | |
| --- | --- |
| Cabojet 300 (made by Cabot, self-dispersion type pigment) | 10.0 weight part |
| 1,3-butanediol | 15.0 weight part |
| Glycerin | 5.0 weight part |
| Surfactant (general formula (I)) | 1.0 weight part |
| 2-pyrolidone | 2.0 weight part |
| Sodium dehydroacetate | 0.2 weight part |
| Sodium thiosulfate | 0.2 weight part |
| Ion exchanged water | Balance |

(17) Recording Liquid 24 (Used for Example 5, Example 8, Example 9, Example 10 and Comparative Example 8; Black, Self-Dispersion Type)

| | |
|---|---|
| Cabojet 300 (made by Cabot, self-dispersion type pigment) | 10.0 weight part |
| 1,3-butanediol | 22.5 weight part |
| Glycerin | 7.5 weight part |
| Surfactant (general formula (I)) | 1.0 weight part |
| 2-pyrolidone | 2.0 weight part |
| Sodium dehydroacetate | 0.2 weight part |
| Sodium thiosulfate | 0.2 weight part |
| Ion exchanged water | Balance |

(18) Recording Liquid 31 (Used for Comparative Example 7; Yellow, Self-Dispersion Type)

| | |
|---|---|
| C.I. pigment yellow 17 (self-dispersion type) | 10.0 weight part |
| 1,3-butanediol | 7.5 weight part |
| Glycerin | 2.5 weight part |
| Surfactant (general formula (I)) | 1.0 weight part |
| 2-pyrolidone | 2.0 weight part |
| Sodium dehydroacetate | 0.2 weight part |
| Sodium thiosulfate | 0.2 weight part |
| Ion exchanged water | Balance |

(19) Recording Liquid 32 (Used for Example 6; Yellow, Self-Dispersion Type) C. I. Pigment Yellow 17 (Self-Dispersion Type) 10.0 Weight Part

| | |
|---|---|
| 1,3-butanediol | 12.0 weight part |
| Glycerin | 4.0 weight part |
| Surfactant (general formula (I)) | 1.0 weight part |
| 2-pyrolidone | 2.0 weight part |
| Sodium dehydroacetate | 0.2 weight part |
| Sodium thiosulfate | 0.2 weight part |
| Ion exchanged water | Balance |

(20) Recording Liquid 33 (Used for Example 7; Yellow, Self-Dispersion Type)

| | |
|---|---|
| C.I. pigment yellow 17 (self-dispersion type) | 10.0 weight part |
| 1,3-butanediol | 15.0 weight part |
| Glycerin | 5.0 weight part |
| Surfactant (general formula (I)) | 1.0 weight part |
| 2-pyrolidone | 2.0 weight part |
| Sodium dehydroacetate | 0.2 weight part |
| Sodium thiosulfate | 0.2 weight part |
| Ion exchanged water | Balance |

(21) Recording Liquid 34 (Used for Example 5, Example 8, Example 9, Example 10 and Comparative Example 8; Yellow, Self-Dispersion Type)

| | |
|---|---|
| C.I. pigment yellow 17 (self-dispersion type) | 10.0 weight part |
| 1,3-butanediol | 22.5 weight part |
| Glycerin | 7.5 weight part |
| Surfactant (general formula (I)) | 1.0 weight part |
| 2-pyrolidone | 2.0 weight part |
| Sodium dehydroacetate | 0.2 weight part |
| Sodium thiosulfate | 0.2 weight part |
| Ion exchanged water | Balance |

<Production 2 of Treatment Liquid>

Components of each of the following treatment liquids were mixed, and then were filtered by a Teflon filter of 0.8 μm, to thereby produce each treatment liquid.

(9) Treatment Liquid 11 (Used for Example 5, and Comparative Example 7)

| | |
|---|---|
| Cationic silica (ST-AK made by Nissan Chemical Industries, Ltd.) | 15.0 weight part (solid) |
| Glycerin | 5.0 weight part |
| Surfactant (general formula (I)) | 1.0 weight part |
| 2-ethyl-1,3-hexanediol | 2.0 weight part |
| Sodium dehydroacetate | 0.2 weight part |
| Sodium thiosulfate | 0.2 weight part |
| Ion exchanged water | Balance |

(10) Treatment Liquid 12 (Used for Example 6, Example 7, and Example 8)

| | |
|---|---|
| Cationic silica (ST-AK made by Nissan Chemical Industries, Ltd.) | 15.0 weight part (solid) |
| Glycerin | 10.0 weight part |
| Surfactant (general formula (I)) | 1.0 weight part |
| 2-ethyl-1,3-hexanediol | 2.0 weight part |
| Sodium dehydroacetate | 0.2 weight part |
| Sodium thiosulfate | 0.2 weight part |
| Ion exchanged water | Balance |

(11) Treatment Liquid 13 (Used for Example 9)

| | |
|---|---|
| Alumina (Alumina sol 520 made by Nissan Chemical Industries, Ltd.) | 15.0 weight part (solid) |
| Glycerin | 10.0 weight part |
| Surfactant (general formula (I)) | 1.0 weight part |
| 2-ethyl-1,3-hexanediol | 2.0 weight part |
| Sodium dehydroacetate | 0.2 weight part |
| Sodium thiosulfate | 0.2 weight part |
| Ion exchanged water | Balance |

(12) Treatment Liquid 14 (Used for Example 10)

| | |
|---|---|
| Cationic silica (ST-AK made by Nissan Chemical Industries, Ltd.) | 15.0 weight part (solid) |
| Glycerin | 10.0 weight part |
| Surfactant (general formula (I)) | 1.0 weight part |
| 2-ethyl-1,3-hexanediol | 2.0 weight part |
| Cation G50 (cationic surfactant made by Sanyo Chemical Industries, Ltd.) | 4.0 weight part |
| Sodium dehydroacetate | 0.2 weight part |
| Sodium thiosulfate | 0.2 weight part |
| Ion exchanged water | Balance |

(13) Treatment Liquid 15 (Used for Comparative Example 8)

| Anionic silica (ST-ZL made by Nissan Chemical Industries, Ltd.) | 34.6 weight part (solid) |
|---|---|
| Glycerin | 10.0 weight part |
| Surfactant (general formula (I)) | 1.0 weight part |
| 2-ethyl-1,3-hexanediol | 2.0 weight part |
| Sodium dehydroacetate | 0.2 weight part |
| Sodium thiosulfate | 0.2 weight part |
| Ion exchanged water | Balance |

<Viscosity Measurement 2>

The recording liquid and the treatment liquid thus produced were measured for viscosity at 25° C. with a rotary R-type viscosimeter (Series 500 made by TOKI SANGYO CO., LTD.).

EXAMPLE 5

A black recording liquid cartridge was loaded with a black recording liquid 24, a yellow recording liquid cartridge was loaded with a yellow recording liquid 34, and a treatment liquid cartridge was loaded with a treatment liquid 11, thereafter the above cartridges were mounted to an ink-jet printer in FIG. 3, to thereby carry out a print evaluation. My paper (plain paper sheet made by 1%6 Ricoh Co., Ltd.) was used for a recording medium for carrying out a print test. Printing was carried out in such an order that the treatment liquid was adhered at first to the paper sheet, and subsequently the recording liquids of various colors were adhered on the treatment liquid.

Image quality of the record article thus printed was evaluated in the following manner.

<Image Quality Evaluation 2>

(1) Feathering

An image quality was evaluated by observing a black character portion and comparing it with a rank sample.

| Rank 5: | No feathering is found. |
|---|---|
| Rank 4: | Very few featherings are found. |
| Rank 3: | Featherings are found but are not practically problematical. |
| Rank 2: | A fair amount of featherings are found. |
| Rank 1: | Many featherings are found. |

(2) Color Bleeding

An image quality was evaluated by observing a boundary portion between a black solid image and a yellow solid image and comparing it with a rank sample.

| Rank 5: | No mixed color is found. |
|---|---|
| Rank 4: | Very few mixed colors are found. |
| Rank 3: | Mixed colors are found but are not practically problematical. |
| Rank 2: | A fair amount of mixed colors are found. |
| Rank 1: | Many mixed colors are found. |

(3) Image Density and Back-Through Density

An optical density was measured from a surface of the black solid image portion and from a backface of the black solid image portion, to thereby obtain respectively an image density and a back-through density.

(4) Dryness

Immediately after the printing was completed, a recording medium (My paper made by 1%6 Ricoh Co., Ltd.) was pressed to a record article under a certain pressure, so as to check for ink transfer of the black solid image portion.

(5) Waterproof

After being dipped in ion exchanged water for 1 minute, the record article was taken out, and water adhesion was absorbed with a paper towel for natural dry. Density of the black solid image was measured before and after the dipping, and change ratio was determined as a fading ratio.

Example 6 to Example 10

Print tests in the example 5 were repeated, except that the black recording liquid 24, the yellow recording liquid 34 and the treatment liquid 11 in the example 5 were replaced respectively with those shown in Table 3, to thereby carry out an evaluation on image quality of the record article.

Comparative Example 7 and Comparative Example 8

Print tests in the example 5 were repeated, except that the black recording liquid 24, the yellow recording liquid 34 and the treatment liquid 11 in the example 5 were replaced respectively with those shown in Table 3, to thereby carry out an evaluation on image quality of the record article.

Table 3 shows results of evaluation on image quality of the record article obtained by the example 5 to the example 10 and by the comparative example 7 and the comparative example 10. FIG. 3 also shows viscosity at 25° C. of the recording liquid and the treatment liquid used therefor.

TABLE 3

| | Black recording liquid | | Yellow recording liquid | | Treatment liquid | | Feathering | Color bleeding | Image density | Back-through density | Dryness Ink | Waterproof Fading |
|---|---|---|---|---|---|---|---|---|---|---|---|---|
| | No. | Viscosity | No. | Viscosity | No. | Viscosity | Rank | Rank | (OD) | (OD) | transfer | ratio (%) |
| Example 5 | 24 | 8.16 | 34 | 8.01 | 11 | 4.03 | 3.0 | 3.5 | 1.75 | 0.05 | Not found | 5.5 |
| Example 6 | 22 | 4.10 | 32 | 3.91 | 12 | 5.02 | 3.0 | 3.0 | 1.74 | 0.04 | Not found | 4.3 |
| Example 7 | 23 | 5.16 | 33 | 5.01 | 12 | 5.02 | 3.5 | 3.5 | 1.78 | 0.05 | Not found | 2.5 |
| Example 8 | 24 | 8.16 | 34 | 8.01 | 12 | 5.02 | 4.0 | 4.0 | 1.80 | 0.03 | Not found | 2.1 |
| Example 9 | 24 | 8.16 | 34 | 8.01 | 13 | 4.48 | 3.5 | 3.0 | 1.73 | 0.04 | Not found | 2.5 |

TABLE 3-continued

| | Black recording liquid | | Yellow recording liquid | | Treatment liquid | | Feathering Rank | Color bleeding Rank | Image density (OD) | Back-through density (OD) | Dryness Ink transfer | Waterproof Fading ratio (%) |
|---|---|---|---|---|---|---|---|---|---|---|---|---|
| | No. | Viscosity | No. | Viscosity | No. | Viscosity | | | | | | |
| Example 10 | 24 | 8.16 | 34 | 8.01 | 14 | 5.20 | 5.0 | 5.0 | 1.85 | 0.02 | Not found | 1.6 |
| Comparative example 7 | 21 | 3.45 | 31 | 3.22 | 11 | 4.03 | 2.0 | 2.0 | 1.65 | 0.08 | Found | 7.1 |
| Comparative example 8 | 24 | 8.16 | 34 | 8.01 | 15 | 5.30 | 1.0 | 1.0 | 1.50 | 0.15 | Found | 10.2 |

Remark: viscosity unit is mPa/sec.

As is seen in Table 3, the example 5 to the example 10 with their at least one of the recording liquid and the treatment liquid having the viscosity of 5 mPa·sec belong to rank 3.0 or more in terms of feathering and color bleeding, which rank is not practically problematical. It is noted that the aggregation formed by the anionic colorant included in the recording liquid and the cationic particle included in the treatment liquid is held by means of the viscosity of mixture of the recording liquid and the treatment liquid without being flown out, and that the feathering and the color bleeding are suppressed. Moreover, the image density shows high values of 1.73 to 1.85, while the back-through density shows low values of 0.02 to 0.05. With this, the aggregation is accumulated in a form of a stone wall in the vicinity of the surface of the recording medium to thereby increase the image density, and permeation out to the back of the recording medium is suppressed to thereby decrease the back-through density. Moreover, even pressing the recording medium to the record article obtained immediately after printing does not cause ink transfer, which proves that permeation of the vehicle (included in the recording liquid and the treatment liquid) in the recording medium is accelerated and the dryness of the record image is good. In addition, change in the image density after the record article is dipped for 1 minute in the ion exchanged water shows a low fading rate of 1.6% to 5.5%, proving that the aggregation formed by the anionic colorant and the cationic particle helps improve waterproof of the record image.

On the other hand, although using the anionic colorant for the recording liquid and the cationic particle for the treatment liquid, the comparative example 7 has the viscosity of each of the recording liquid and the treatment liquid less than 55 mPa·sec, belonging to a low rank 2.0 in terms of feathering and color bleeding and featuring a fairly low image density of 1.65 and a fairly high back-through density of 0.08. The dryness and the waterproof of the example 7 are also inferior. An insufficient viscosity of mixture of the recording liquid and the treatment liquid seems to have caused the anionic colorant and the cationic particle to flow out, resulting in the above.

Moreover, the comparative example 8 using the anionic colorant for the recording liquid and the anionic particle for the treatment liquid has viscosity of each of the recording liquid and the treatment liquid 5P3D·VHF or more. In this case, however, the anionic colorant and the anionic particle forming no aggregation caused deteriorated image quality evaluations.

As described in detail and specifically above, use of the recording liquid including the resin-coated colorant can obtain a print having a good wear resistance, the treatment liquid and the recording liquid forming the aggregation can suppress the feathering and the color bleeding, use of the cationic particle and the anionic colorant can effectively form the aggregation to thereby further suppress the feathering and the color bleeding, moreover, use of the cationic inorganic particle can further effectively form the aggregation to thereby further suppress the feathering and the color bleeding, moreover, use of the cationic silica can further effectively form the aggregation to thereby further suppress the feathering and the color colorant, the treatment liquid including the water and the water-soluble solvent can decrease ignitability and decrease skin stimulation to thereby increase safety, the treatment liquid including the humectant can prevent clogging of the head, the treatment liquid including the penetrant can allow the liquid to easily permeate in the paper sheet to thereby increase dryness, the treatment liquid including the first antiseptic (preventing corrosion) and the second antiseptic (preventing mold) can increase a long-term storage stability, the treatment liquid including the cationic surfactant can improve aggregation property to thereby further suppress the feathering and color bleeding, use of the pigment for the colorant in the recording liquid can improve aggregation property to thereby suppress the feathering and the color bleeding, the recording liquid including the water and the water-soluble solvent can decrease ignitability and decrease skin stimulation to thereby increase safety, the recording liquid including the humectant can prevent clogging of the head, the recording liquid including the penetrant can allow the liquid to easily permeate in the paper sheet to thereby increase dryness, the recording liquid including the first antiseptic (preventing corrosion) and the second antiseptic (preventing mold) can increase a long-term storage stability.

Under the present invention paying attention to the viscosity, the recording liquid including the anionic colorant and the treatment liquid including the cationic particle, at least one of the recording liquid and the treatment liquid having viscosity of 5 mPa·sec or more at 25° C. can suppress the feathering and the color bleeding and can provide an ink set giving a record image that has high image density and high image quality free from back-through. Particularly, when being printed on a plain paper sheet, an ink-jet printing method and an ink-jet printer can be provided which cause high image density and are excellent in double-sided printing without causing feathering and color bleeding, and which have a good dryness of the record image.

Moreover, the above ink-jet printing method can provide a record article having an improved waterproof and light resistance.

What is claimed is:
1. An ink set comprising:
a recording liquid composed of a black recording liquid and a color recording liquid, the black recording liquid and the color recording liquid each including a resin- coated anionic colorant and a water-soluble solvent which contains a humectant and a penetrant; and a treatment liquid including a cationic particle and a water-soluble solvent which contains a humectant and a penetrant, wherein the cationic particle has reactivity with the resin-coated anionic colorant and is made of a cationic inorganic material, wherein the recording liquid has a viscosity of 5 mPa·sec or more at 25° C. and the treatment liquid has a viscosity of 5 mPa·sec or more at 25°C. and the resin-coated anionic colorant is selected from one of carbon black having carboxyl group or sulfonic group and pigment in which carboxyl group or sulfonic group is introduced.

2. An ink set according to claim 1, wherein an aggregation is formed when the treatment liquid and the recording liquid contact with each other.

3. An ink set according to claim 1, wherein the resin-coated anionic colorant is pigment in which carboxyl group or sulfonic group is introduced.

4. A treatment liquid used for an ink set, said ink set further comprising a recording liquid composed of a black recording liquid and a color recording liquid, the black recording liquid and the color recording liquid each including a resin-coated anionic colorant and a water-soluble solvent which contains a humectant and a penetrant, the treatment liquid comprising:

a cationic particle which has reactivity with the resin-coated anionic colorant and is made of a cationic inorganic material; and a water-soluble solvent which contains a humectant and a penetrant, wherein the recording liquid has a viscosity of 5 mPa·sec or more at 25° C. and the treatment liquid has a viscosity of 5 mPa·sec or more at 25° C. and the resin-coated anionic colorant is selected from one of carbon black having carboxyl group or sulfonic group and pigment in which carboxyl group or sulfonic group is introduced.

5. A treatment liquid according to claim 4, wherein the cationic inorganic material is a cationic silica.

6. A treatment liquid according to claim 4, wherein the treatment liquid includes a water.

7. A treatment liquid according to claim 4, wherein the treatment liquid includes an antiseptic for preventing at least one of a corrosion and a mold.

8. A treatment liquid according to claim 4, wherein the treatment liquid includes a cationic surfactant.

9. A treatment liquid according to claim 4, wherein the treatment liquid includes a rust preventive.

10. A recording liquid used for an ink set, said ink set further comprising a treatment liquid including a cationic particle and a water-soluble solvent which contains a humectant and a penetrant, the recording liquid composed of a black recording liquid and a color recording liquid, the black recording liquid and the color recording liquid each comprising:

a resin-coated anionic colorant which has reactivity with the cationic particle included in the treatment liquid and made of a cationic inorganic material; and, a water-soluble solvent which contains a humectant and a penetrant, wherein the recording liquid has a viscosity of 5 mPa·sec or more at 25° C. and the treatment liquid has a viscosity of 5 mPa·sec or more at 25° C. and the resincoated anionic colorant is selected from one of carbon black having carboxyl group or sulfonic group and pigment in which carboxyl group or sulfonic group is introduced.

11. A recording liquid according to claim 10, wherein the anionic colorant is a pigment colorant.

12. A recording liquid used for an ink set, said ink set further comprising a treatment liquid including a cationic particle and a water-soluble solvent which contains a humectant and a penetrant, the recording liquid composed of a black recording liquid and a color recording liquid, the black recording liquid and the color recording liquid each comprising:

a resin-coated anionic colorant which has reactivity with the cationic particle included and made of a cationic inorganic material;

a water; and a water-soluble solvent which contains a humectant and a penetrant, wherein the recording liquid has a viscosity of 5 mPa·sec or more at 25° C. and the treatment liquid has a viscosity of 5 mPa·sec or more at 25° C. and the resincoated anionic colorant is selected from one of carbon black having carboxyl group or sulfonic group and pigment in which carboxyl group or sulfonic group is introduced.

13. A recording liquid according to claim 12, wherein the recording liquid includes an antiseptic for preventing at least one of a corrosion and a mold.

14. A recording liquid according to claim 12, wherein the recording liquid includes a rust preventive.

15. An ink-jet printing method for forming an image, by using an ink set including (1) a recording liquid composed of a black recording liquid and a color recording liquid, the black recording liquid and the color recording liquid each including a resin-coated anionic colorant and a water-soluble solvent which contains a humectant and a penetrant, and (2) a treatment liquid including a cationic particle and a water-soluble solvent which contains a humectant and a penetrant, wherein the cationic particle has reactivity with the resin-coated anionic colorant and is made of a cationic inorganic material and the resin-coated anionic colorant is selected from one of carbon black having carboxyl group or sulfonic group and pigment in which carboxyl group or sulfonic group is introduced, the ink-jet printing method comprising:

adhering the treatment liquid having the viscosity of 5 mPa·sec or more at 25° C. and including the cationic particle to a recording medium; and adhering the recording liquid having the viscosity of 5 mPa·sec or more at 25° C. and including the anionic colorant to the recording medium, to thereby form the image on the recording medium.

16. An ink-jet recorder for forming an image, by using an ink set including (1) a recording liquid composed of a black recording liquid and a color recording liquid, the black recording liquid and the color recording liquid each including a resin-coated anionic colorant and a water-soluble solvent which contains a humectant and a penetrant, and (2) a treatment liquid including a cationic particle and a water-soluble solvent which contains a humectant and a penetrant, wherein the cationic particle has reactivity with the resin-coated anionic colorant and is made of a cationic inorganic material and the resin-coated anionic colorant is selected from one of carbon black having carboxyl group or sulfonic group and pigment in which carboxyl group or sulfonic group is introduced, the ink-jet recorder comprising:
- a conveying section for conveying a recording medium;
- a first adhering section for adhering the treatment liquid having the viscosity of 5 mPa·sec or more at 25° C. and including the cationic particle to the recording medium; and
- a second adhering section for adhering the recording liquid having the viscosity of 5 mPa·sec or more at 25° C. and including the anionic colorant to the recording medium,
- to thereby form the image on the recording medium.

17. A treatment liquid cartridge for receiving therein a treatment liquid which is used for an ink set, said ink set further comprising a recording liquid composed of a black recording liquid and a color recording liquid, the black recording liquid and the color recording liquid each including a resin-coated anionic colorant and a water-soluble solvent which contains a humectant and a penetrant, and the treatment liquid including a cationic particle and a water-soluble solvent which contains a humectant and a penetrant, wherein the cationic particle has reactivity with the resin-coated anionic colorant and is made of a cationic inorganic material, wherein the recording liquid has a viscosity of 5 mPa·sec or more at 25° C. and the treatment liquid has a viscosity of 5 mPa·sec or more at 25° C. and the resin-coated anionic colorant is selected from one of carbon black having carboxyl group or sulfonic group and pigment in which carboxyl group or sulfonic group is introduced.

18. A recording liquid cartridge for receiving therein a recording liquid which is used for an ink set, said ink set further comprising a treatment liquid, the recording liquid composed of a black recording liquid and a color recording liquid, the black recording liquid and the color recording liquid each including a resin-coated anionic colorant and a water-soluble solvent which contains a humectant and a penetrant, and the treatment liquid including a cationic particle and a water-soluble solvent which contains a humectant and a penetrant, wherein the cationic particle has reactivity with the resin-coated anionic colorant and is made of a cationic inorganic material, wherein the recording liquid has a viscosity of 5 mPa·sec or more at 25° C. and the treatment liquid has a viscosity of 5 mPa·sec or more at 25° C. and the resincoated anionic colorant is selected from one of carbon black having carboxyl group or sulfonic group and pigment in which carboxyl group or sulfonic group is introduced.

19. An inkjet record article which is produced by using an ink-jet recorder for forming an image by using
- an ink set including (1) a recording liquid composed of a black recording liquid and a color recording liquid, the black recording liquid and the color recording liquid each including a resin-coated anionic colorant and a water-soluble solvent which contains a humectant and a penetrant, and (2) a treatment liquid including a cationic particle and a water-soluble solvent which contains a humectant and a penetrant, wherein the cationic particle has reactivity with the resin-coated anionic colorant and is made of a cationic inorganic material and the resin-coated anionic colorant is selected from one of carbon black having carboxyl group or sulfonic group and pigment in which carboxyl group or sulfonic group is introduced, the ink-jet recorder comprising:
- a conveying section for conveying a recording medium;
- a first adhering section for adhering the treatment liquid having the viscosity of 5 mPa·sec or more at 25° C. and including the cationic particle to the recording medium; and
- a second adhering section for adhering the recording liquid having the viscosity of 5 mPa·sec or more at 25° C. and including the anionic colorant to the recording medium,
- to thereby form the image on the recording medium.

* * * * *